(12) United States Patent
Cupps et al.

(10) Patent No.: US 6,976,180 B2
(45) Date of Patent: Dec. 13, 2005

(54) PERSONAL ELECTRONICS DEVICE

(75) Inventors: Bryan T. Cupps, Capitola, CA (US); Timothy J. Glass, Aptos, CA (US)

(73) Assignee: Dualcor Technologies, Inc., San Francisco, CA (US)

( * ) Notice: Subject to any disclaimer, the term of this patent is extended or adjusted under 35 U.S.C. 154(b) by 537 days.

(21) Appl. No.: 10/158,266

(22) Filed: May 30, 2002

(65) Prior Publication Data

US 2003/0226044 A1 Dec. 4, 2003

Related U.S. Application Data

(63) Continuation-in-part of application No. 09/809,963, filed on Mar. 16, 2001.

(51) Int. Cl.$^7$ .............................................. G06F 3/14
(52) U.S. Cl. ..................................................... 713/300
(58) Field of Search ....................................... 713/300

(56) References Cited

U.S. PATENT DOCUMENTS

| | | | |
|---|---|---|---|
| 2003/0065734 A1 * | 4/2003 | Ramakesavan | 709/211 |
| 2003/0084206 A1 * | 5/2003 | Floman et al. | 710/1 |
| 2004/0203909 A1 * | 10/2004 | Koster | 455/457 |

* cited by examiner

Primary Examiner—John R. Cottingham
(74) Attorney, Agent, or Firm—Fulwider Patton, et al.; Ellsworth R. Roston

(57) ABSTRACT

First (embedded) and second (non-embedded) processors are energized by an energy source in a hand-held device. The second processor performs functions requiring more power than those performed by the first processor. The second processor is normally asleep and is awakened by the first processor and is empowered, when awakened, to perform functions. Only the portions of the second processor required to perform these functions are activated. Protocols for functions to be performed by the second processor are provided initially to the second processor and are processed in the second processor. They are then transferred to the first processor for storage. When the second processor is activated to perform functions represented by a protocol, the protocol is transferred to the second processor and the functions are performed by the second processor.

33 Claims, 16 Drawing Sheets

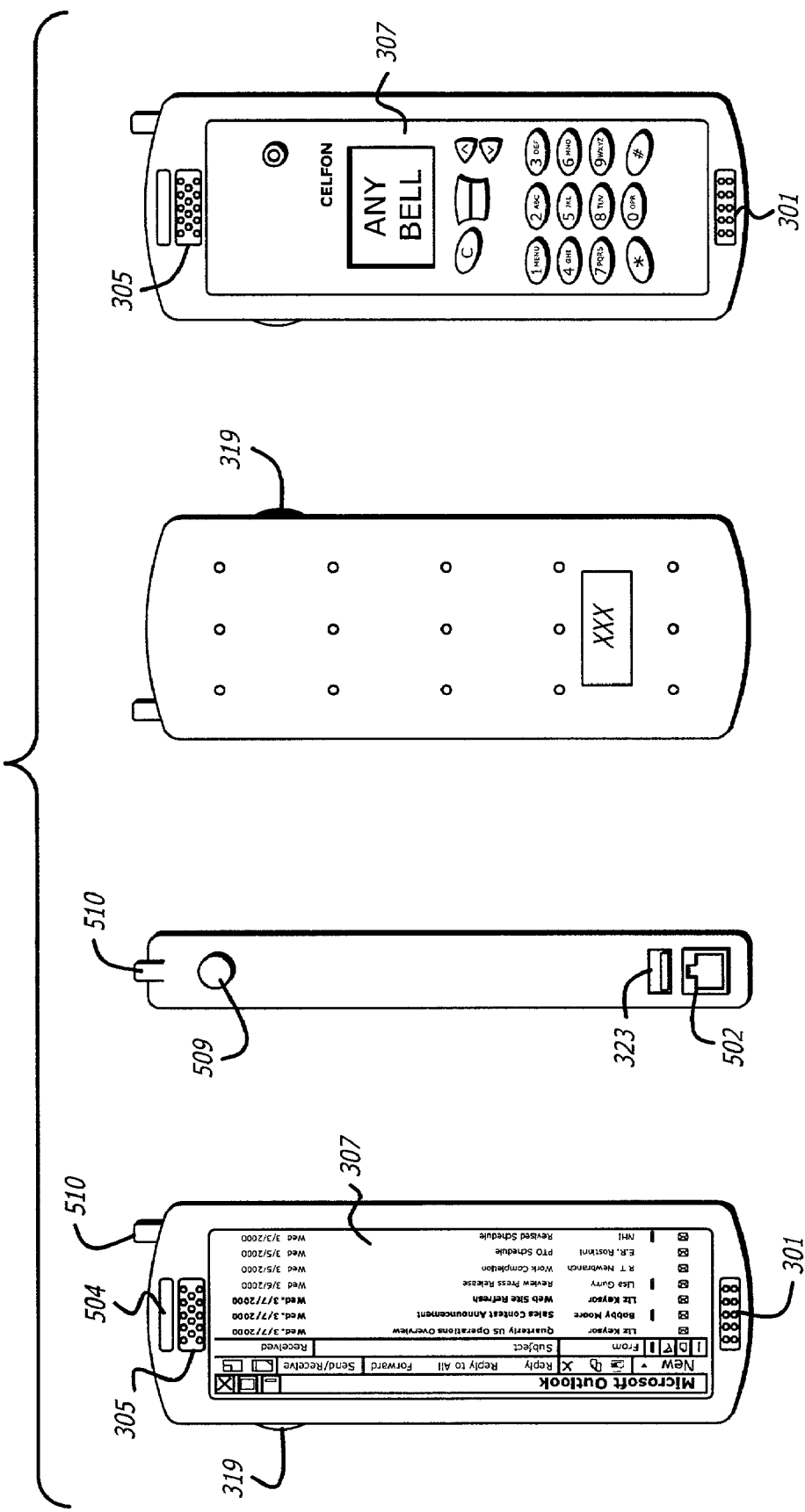

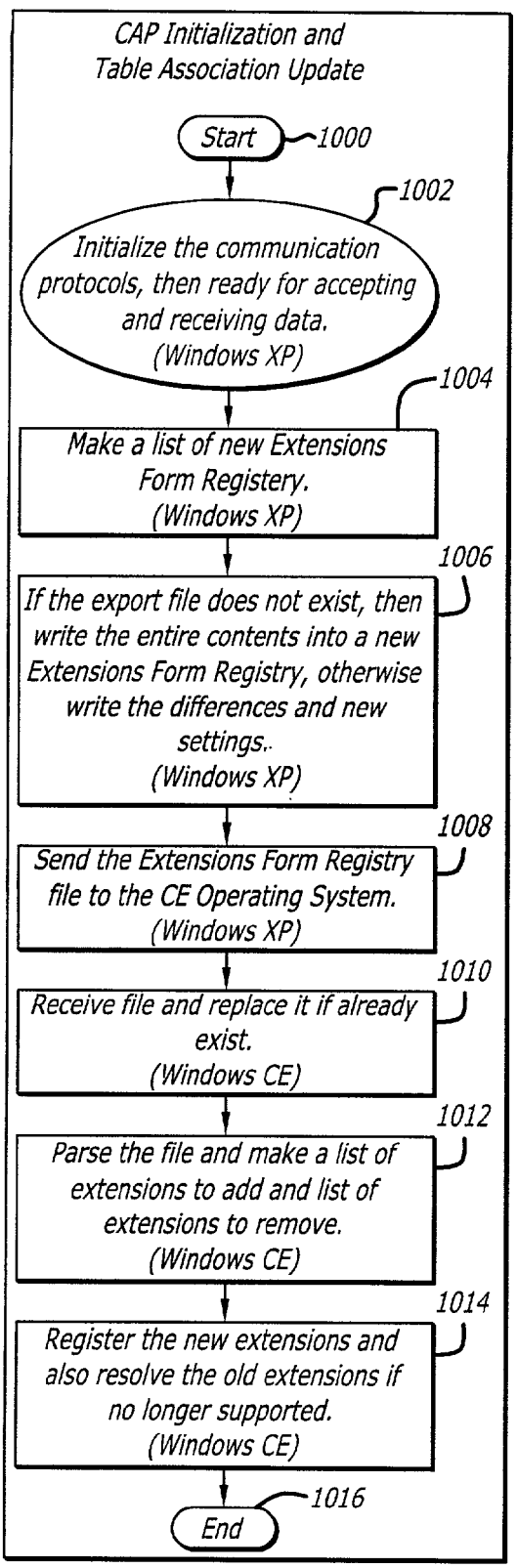
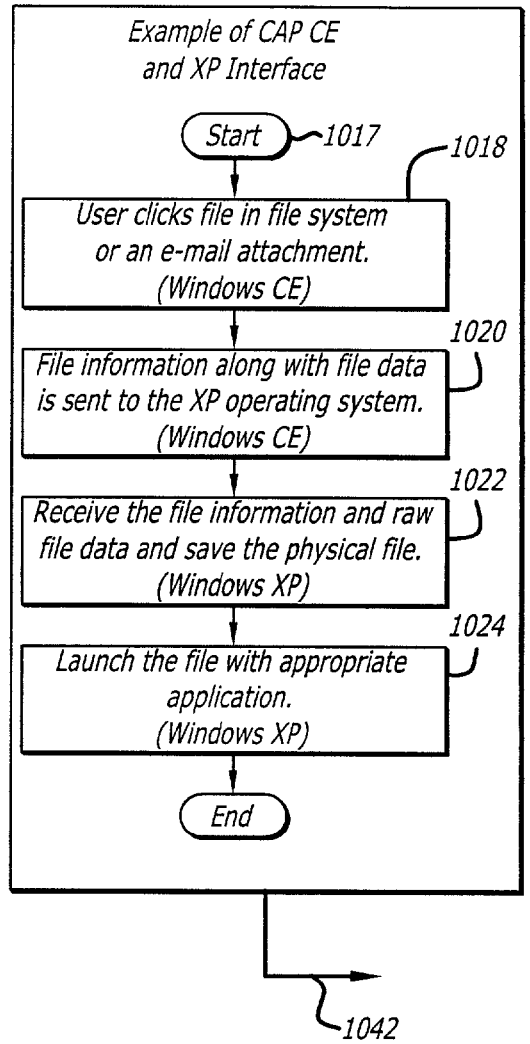
FIG. 11
FIG. 12

PERSONAL ELECTRONICS DEVICE

This application is a continuation-in-part of application Ser. No. 09/809,963 filed Mar. 16, 2001.

BACKGROUND OF A PREFERRED EMBODIMENTS OF THE INVENTION

This invention pertains to personal electronic devices in the general category of Smart Handheld Devices (including PDAs, Personal Companions, PC Companions, Smart Phones, Data-enabled Mobile Phones), PC Computers (including portables, laptops, notebooks, ultra portables and desktop computers), mobile telephones, and the like.

This invention relates to a system for, and method of, performing a significantly increased range of functions in a handheld unit. The system and method of the invention provide for the performance, in a single handheld unit and with a single energy source, of many of the functions specified in the previous paragraph. The system and method of this invention provide for the performance of these functions in the handheld unit over an extended time period without having to recharge or replace the energy source.

BACKGROUND OF THE INVENTION

With electronics becoming increasingly more sophisticated, a wide variety of devices has become available to provide users with a tool to help them manage their affairs and improve their ability to communicate with others both at work and in their personal lives. Computers are well known and have taken on a variety of flavors, including portable computers, which can be carried from place to place relatively conveniently. Mobile telephones have come into widespread use due to their small size and ease of use and the widespread availability of cellular services in a large portion of the industrialized world. More recently, small computer-like devices having limited computational capabilities have become popular and are often referred to as "Smart Handheld Devices" or "Personal Digital Assistants" (PDAs). Such PDAs are typically small hand held devices including a battery, a liquid or digital display (LCD) touchscreen, a small amount of memory (typically on the order of 8 to 16 megabytes of random access memory (RAM) and a small amount of computer processing capability. Given the small battery size and the limited memory and computational power, such PDAs have typically been used for contact management, scheduling appointments, and email. The common practice of a PDA user is to routinely synchronize his/her PDA with his/her desktop PC computer. This synchronization requirement is awkward and time consuming to maintain.

FIG. 1 is a block diagram depicting a typical prior art cellular telephone, including a battery, a display, a man-machine interface (MMI) and a cellular telephone module which includes radio frequency (RF) circuitry, and a Digital Signal Processor (DSP).

A current trend is to include both PDA functions and cellular telephone functions in a single device. One such device is the HandSpring® Visor® phone system, which basically takes a HandSpring PDA device and a separate cellular telephone device mechanically attached to the PDA. This device is shown in a block diagram in FIG. 2A in which System 100 includes PDA 101 and an attached Cellular Telephone Module 102. Such a device is somewhat cumbersome and includes two separate batteries, a first for PDA 101 and a second for Cellular Telephone Module 102. Since PDA 101 and Cellular Telephone Module 102 are connected by one or more external interfaces, the communication speeds between PDA 101 and Cellular Telephone Module 102 are relatively limited. These devices are heavy, weighing approximately 10 ounces, and have a bulky form-factor, in that a user must "talk" into his/her PDA, while holding the PDA with the Cellular Telephone Module attached.

Another approach is to provide a device which serves as both a PDA and a cellular telephone. Such a device is shown by way of example in FIG. 2B and typically includes a Cellular Telephone Module 201 and an LCD Display 202, a Processor 204, and a Battery 203. This type of device constitutes basically an advance on cellular telephones, including additional features. Such devices may include the Kyocera® pdQ® Smart Phone devices which combines CDMA digital wireless telephone technology with Palm® PDA capabilities. The pdQ® Smart Phone device is essentially a telephone which includes a pushbutton pad for making telephone calls. In this device, the pushbutton pad pivots out of the way to reveal a larger LCD screen for use with PDA functions. Nokia has a similar device, the Nokia® 9110 Communicator, which appears as a basic cellular telephone including pushbutton keys and which opens up to reveal a larger LCD screen and a mini-keypad with PDA functions.

There are significant problems with PDAs, Internet Appliances (IAs) and cellular telephones; the PDA, IA and cellular telephone metaphors are dramatically different than what users expect in the personal computer (PC) world. They have less powerful CPUs, less memory, restricted power consumption, smaller displays, and different and awkward input devices in comparison to what is available in a PC. In the devices there is a limited screen size and the lack of a mouse or touch screen. This requires a different user interface (UI) metaphor, as compared with PCs. In some of these devices, there are touchscreens, but the small display sizes make the input and display of information difficult and cumbersome.

Two big problems with PDAs and IAs are that they lack the full power of a PC and, from a price vs. performance perspective, the limited capabilities outweigh the benefits. Many PDAs are actually "slave devices" to PCs and the IAs lack the horsepower of a "full-blown" PC, such as a Pentium® class PC. For this reason IAs are close enough in functionality to a PC that the price difference is not dramatic enough to warrant purchasing an IA. Similarly, PDAs are significantly less powerful than a PC such that, even with the relatively large price difference, in many cases purchase of a PDA is not justified.

A significant complaint about cellular telephones, PDAs and IAs is that they operate independently of one another. This has required the user to retain a plurality of devices if the user intends to provide the three (3) functions, and obtain the advantages of the PDAs and the IAs. Some inventors have attempted to integrate the PDA and the cellular telephone, but these devices still lack the horsepower, display and input power of a PC. Some integration occurs between PDAs and PCs, because, as mentioned earlier, PDAs are inherently "slave" devices to a PC. However, such integration offers only limited advantages.

Because there will always be a performance gap between the very best desktop computers, PDAs, IAs and cellular telephones, a device is required that combines and consolidates these technologies in a meaningful device. This Novel Personal Electronic Device will combine the functionality of a cellular telephone, PDA, PC and IA. Such a device is disclosed and claimed in application Ser. No. 09/809,963

(the '963 application), filed in the United States Patent and Trademark Office on Mar. 16, 2001 by Brian T. Cupps and Tim J. Glass as joint inventors and assigned of record to the assignee of record of this application.

The invention disclosed and claimed in the '963 application is based on the belief that the convenience of mobile devices should be contained in one universal device. While cellular telephones, PDAs and laptop computers are evolving, the information contained in each is disparate, limited, difficult to view, and often needs to be synchronized with a home or office based PC in order to be useful. Mobile device users are information seekers who are becoming increasingly frustrated with devices that seem to only provide a piece of what they need. In order for users to satisfy their communication and computing requirements, they must manage multiple devices and learn new operating environments that all have their own set of issues.

The invention disclosed and claimed in the '963 application provides for one consummate handheld personal electronic device. Users will not need to learn a new operating system. There is no need for new, third party software development. All the applications that users run each day on their laptops or desktop computers can be utilized. This device is completely mobile, fitting into a shirt picket, a purse or the palm of one's hand. The device utilizes only one battery for two (2) processors, a first one an embedded processor that performs simple functions and a second one a non-embedded processor that performs relatively complicated functions and utilizes increased amounts of power. The second processor is normally inactivated and is activated when the first processor determines that the second processor should perform these functions.

BRIEF DESCRIPTION OF A PREFERRED EMBODIMENT OF THE INVENTION

First (embedded) and second (non-embedded) processors are disposed in a handheld housing for energizing by a power source in the housing. The first processor requires less energy than the second processor. The first and second processors respectively perform simple and complicated functions. The second processor is normally sleeping and is activated by the first processor to perform the complicated functions in accordance with determinations by the first processor. Programs and data for operating the second processor flow initially into the second processor. The second processor processes the programs and data and introduces the processed information to a read-only memory in the first processor. When the second processor is to perform such programs and utilize such data, the first processor introduces such program and data to the second processor for processing by the second processor.

BRIEF DESCRIPTION OF THE DRAWINGS

FIG. 5 depicts one embodiment of the invention disclosed and claimed in application Ser. No. 09/809,963 and shows physical characteristics of this embodiment;

FIG. 11 is a flow chart showing how programs and data intended for use by the non-embedded processor are initially processed by the non-embedded processor and introduced to the embedded processor for storage in the embedded processor;

FIG. 12 is a flow chart showing how the programs and data stored in the embedded processor are transferred to the non-embedded processor for use by the non-embedded processor when the non-embedded processor is awakened and activated.

DETAILED DESCRIPTION OF A PREFERRED EMBODIMENT OF THE INVENTION

Figure 1:
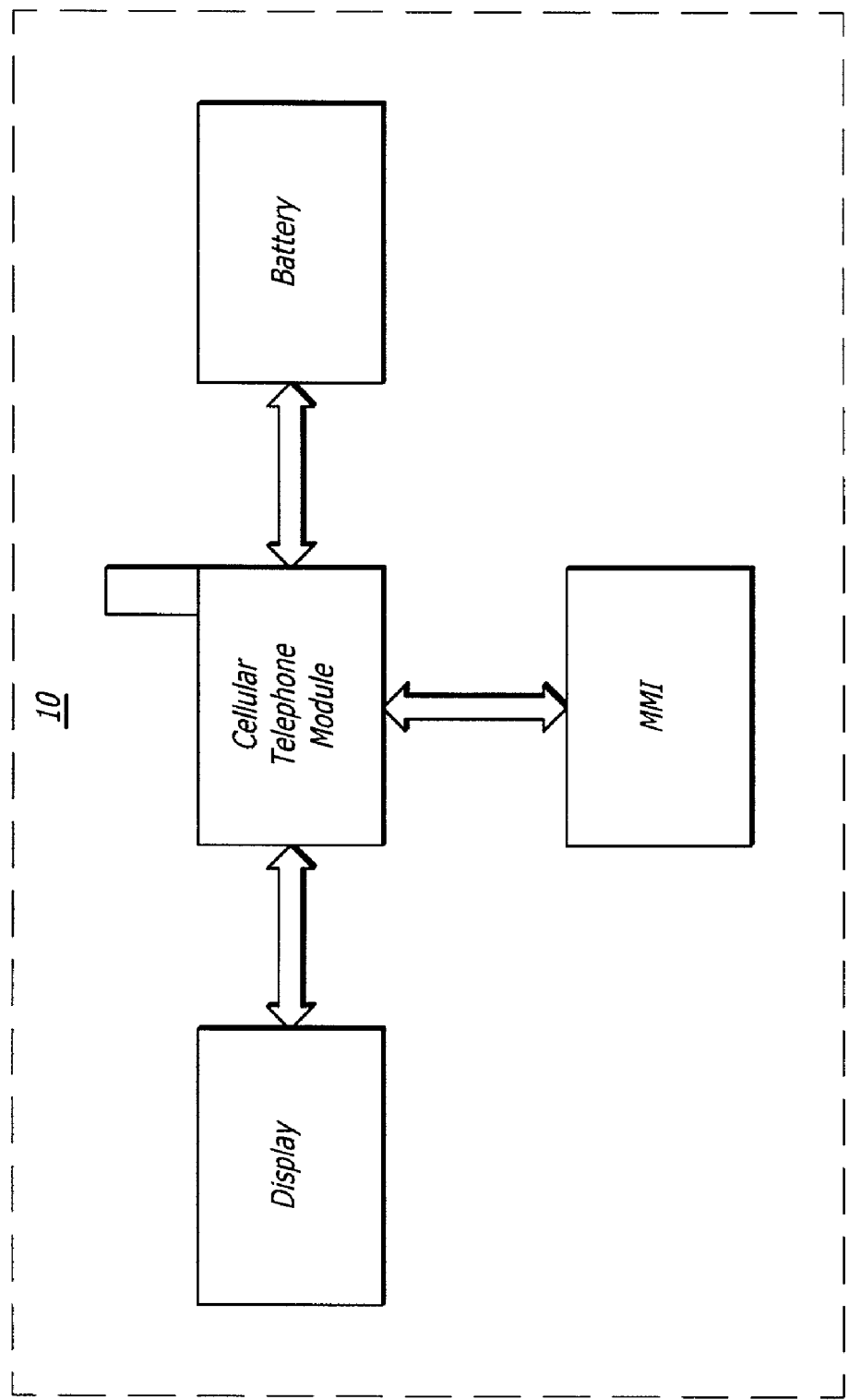
FIG. 1 is a block diagram of a typical prior art cellular telephone.
Figure 2A:
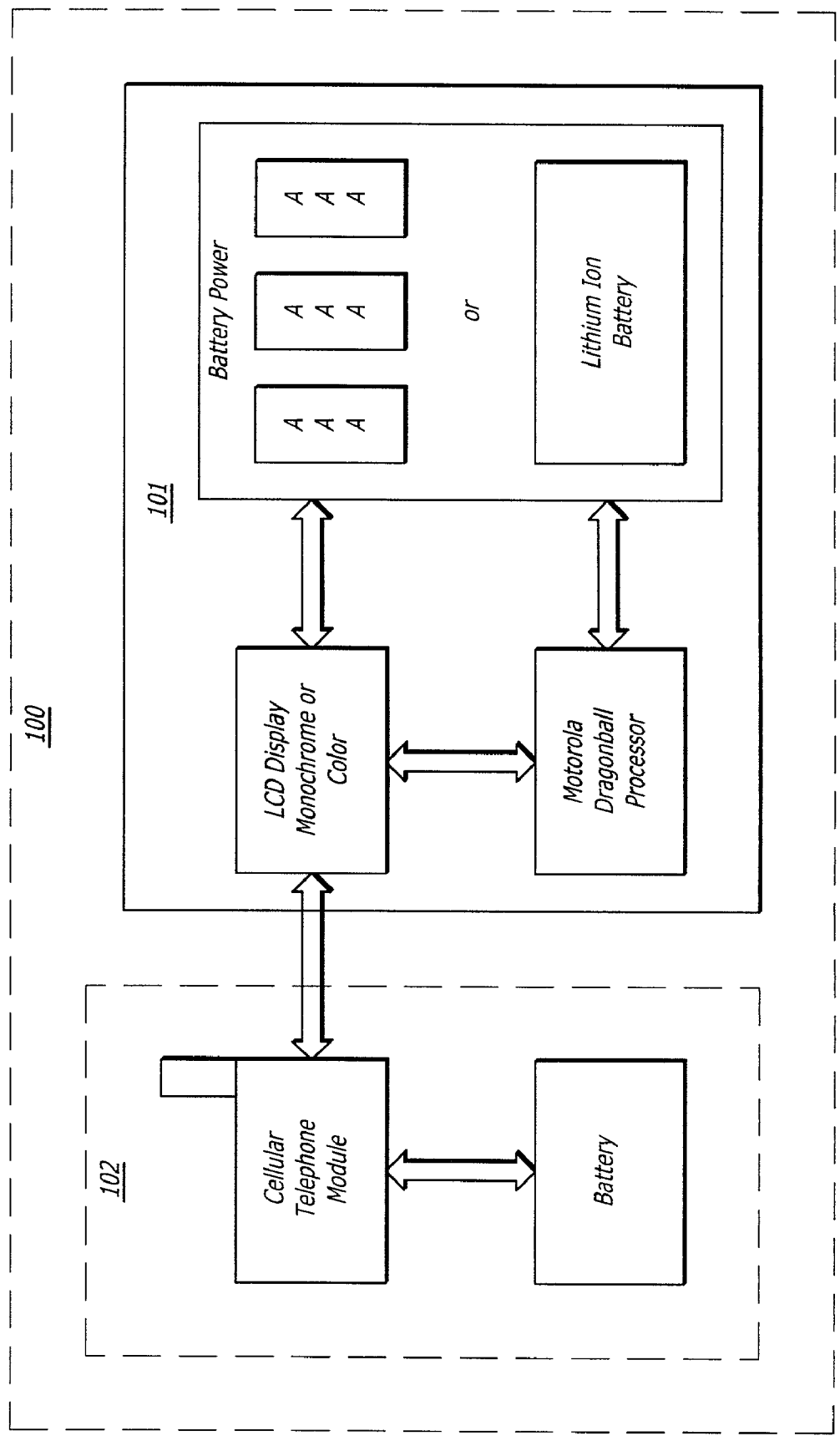
FIG. 2A is a block diagram of a prior art personal digital assistant (PDA) with a physically attached cellular telephone module.
Figure 2B:
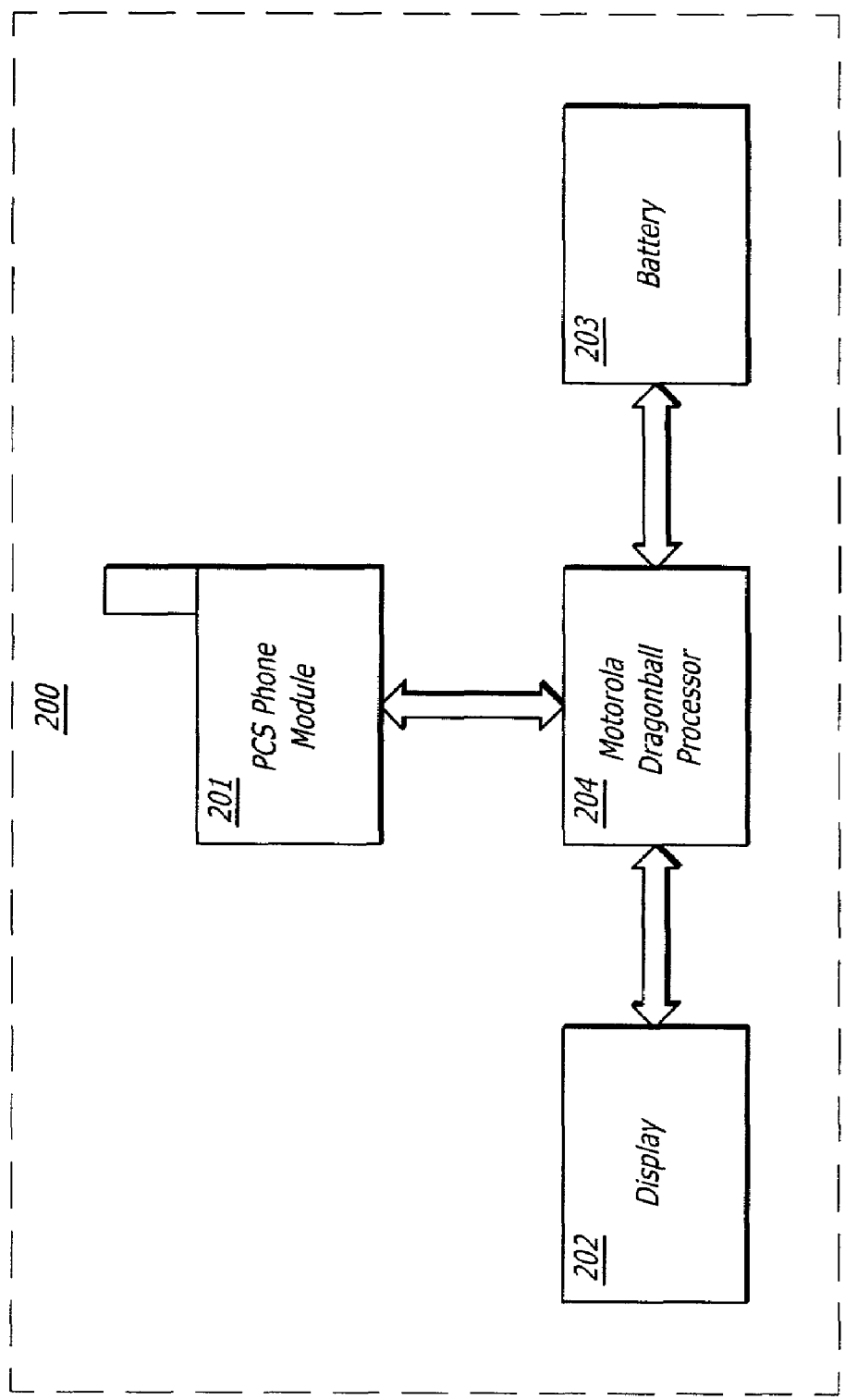
FIG. 2B is a block diagram depicting a prior art integrated cellular telephone and PDA.

In accordance with the teachings of the invention disclosed and claimed in application Ser. No. 09/809,963 a novel electronic device is taught that combines the features of a plurality of devices selected from: cellular telephone, PDA, PC, IA, pager, cordless telephone, remote control unit (for example, for use with television, stereo, entertainment devices, and so forth) and Global Positioning System (GPS) to provide one common easy-to-use universal device and user interface (UI).

In one embodiment of the invention, the novel electronic device is approximately the size of a cellular telephone and includes a large touch screen that provides a liquid crystal display (LCD) and that spans a significant portion of the length and width of the device. For example, the large touch screen may cover an area which would normally be used for both the display and the keypad on a cellular telephone. As one novel feature of this invention, the display and UI change to look appropriate for whatever application in use. For example, if the user desires to use the electronic device as a cellular telephone, the device provides on the LCD screen a cellular telephone image having a full size keypad.

The UI is provided such that the cellular telephone image provided on the LCD will operate when the user touches appropriate locations on the touch screen LCD. This is interpreted by the cellular telephone application as a mouse "click" event. The same functionality can occur through the use of a jog dial by "scrolling" over the keypad number and, when highlighted, "click" the jog dial, by depressing the dial. This is interpreted by the cellular telephone as a mouse "click" event. The same functionality can occur through the use of a jog dial by depressing the dial. This is also interpreted by the cellular telephone as a "mouse" click. The same functionality can occur through the use of a jog dial by depressing the dial. This is also interpreted by the cellular telephone as a "mouse" click.

By using the touch screen, the user pushes the touch screen buttons just as if the user were pushing a keypad on a standard cellular telephone. By speaking into the microphone and through the use of the voice activated software, the user can speak the words "dial phone number" and then speak the telephone number. In one embodiment of this invention, the cellular telephone display and UI are selected from one of a plurality of cellular telephone display images and UIs, so that a user familiar with one brand or model of cellular telephone can have that image and UI to utilize with the device in accordance with the present invention. By touching an appropriate area on the LCD screen, or through the use of the job dial on the device, a user transforms the device into other useful software-driven formats, such as a PDA, T.V. remote control, and so forth.

In one embodiment, the novel electronic device of the present invention utilizes both wireless and PC hardware. In one such embodiment, the device uses three (3) processors, for example, a phone module ARM 7 core processor, the Intel® Embedded StrongARM® 1110 processor, and the Intel® Pentium® III mobile processor. In one embodiment, the phone module is a Class B device, supporting both General Packet Radio Service (GPRS) and Global Special Mobile (GSM) to manage data, Short Messaging System (SMS), voice and fax transmissions. Dual band 900/1800 and 900/1900 support will ensure international access, without the need for separate modules. The Intel® Pentium® III mobile processor handles other office automation tasks, such as word processing and spreadsheet manipulation, as well as third-party software application, and land-line based Internet Protocol (IP) support, all managed by the Microsoft® Windows® Millennium (ME) operating system.

One embodiment of the invention disclosed and claimed in application Ser. No. 09/809,963 may be thought of, for the sake of simplicity, as a PC and a cellular telephone. These two devices have very different power requirements and user expectations for both stand-by time and use time. In addition to the normal individual power management functions for each of these two devices, the invention disclosed and claimed in application Ser. No. 09/809,963 includes an overall system level power management strategy and architecture. This power management strategy allows the device to operate as a cellular telephone independently from the computer in certain modes of operation.

In one embodiment of the invention disclosed and claimed in application Ser. No. 09/809,963, the computer processor is either turned off completely or put into a deep sleep mode any time that the more robust PC functionality is not absolutely needed. For example, when operating as a PDA, the embedded processor, memory and hard disk are used to the exclusion of the PC circuitry and phone module for such functions as contact management and scheduling, these functions having a lower power requirement. For browsing and email, the embedded processor, phone module, memory, and hard disk are utilized to the exclusion of the PC circuitry. When operating simply as a cellular telephone, the cellular telephone circuitry, having lower power requirements is utilized to the exclusion of the PC circuitry and hard disk. In addition, in one embodiment of the invention disclosed and claimed in application Ser. No. 09/809,963, when the battery charge level gets too low for computer usage, the power management mechanism shuts down the computer while still allowing enough talk time so that the cellular telephone can continue to operate.

Figures 1, 3:
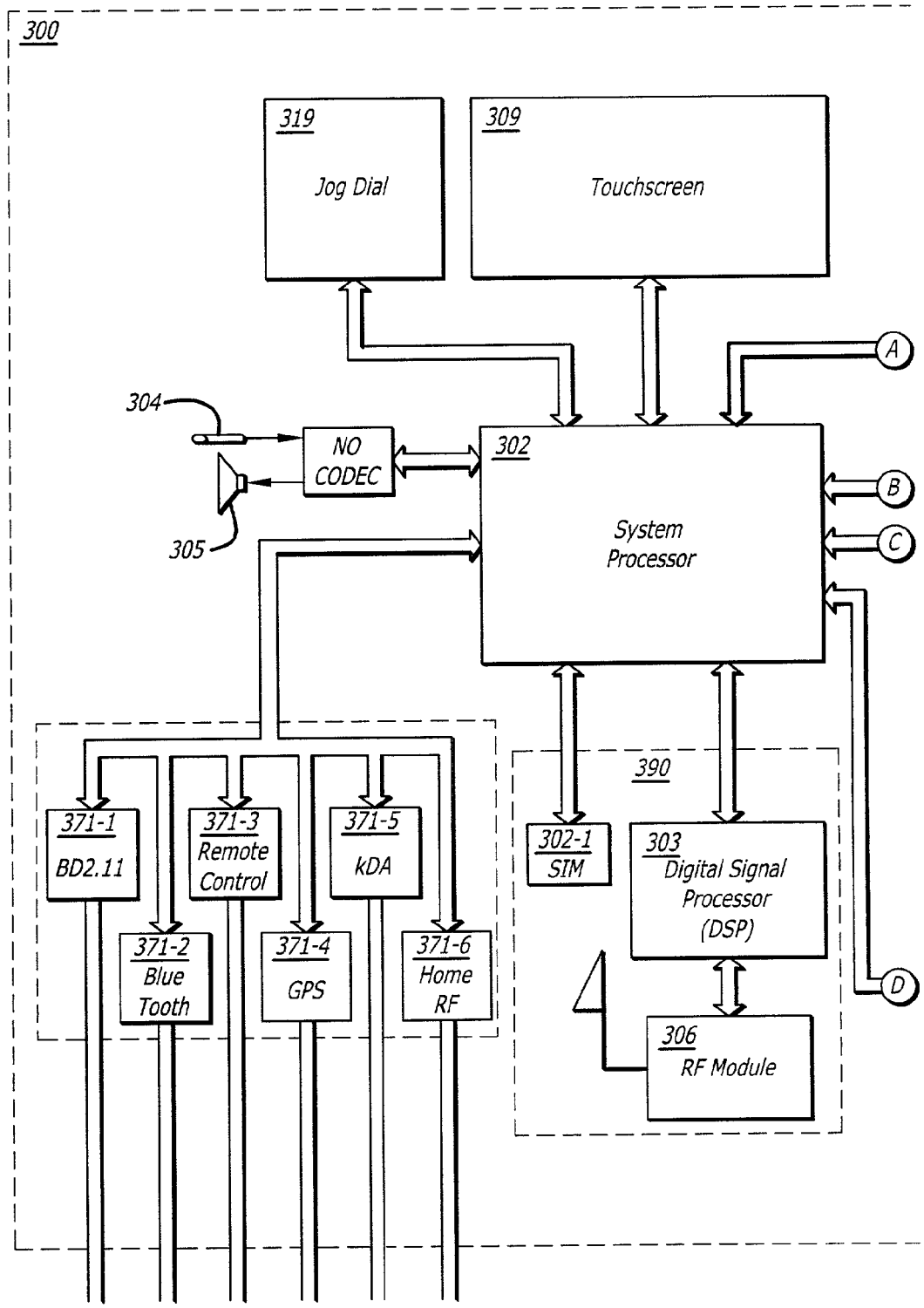
FIG. 3 is a block diagram of one embodiment of a novel personal electronic device of an invention disclosed and claimed in application Ser. No. 09/809,963.
Figures 2, 3:
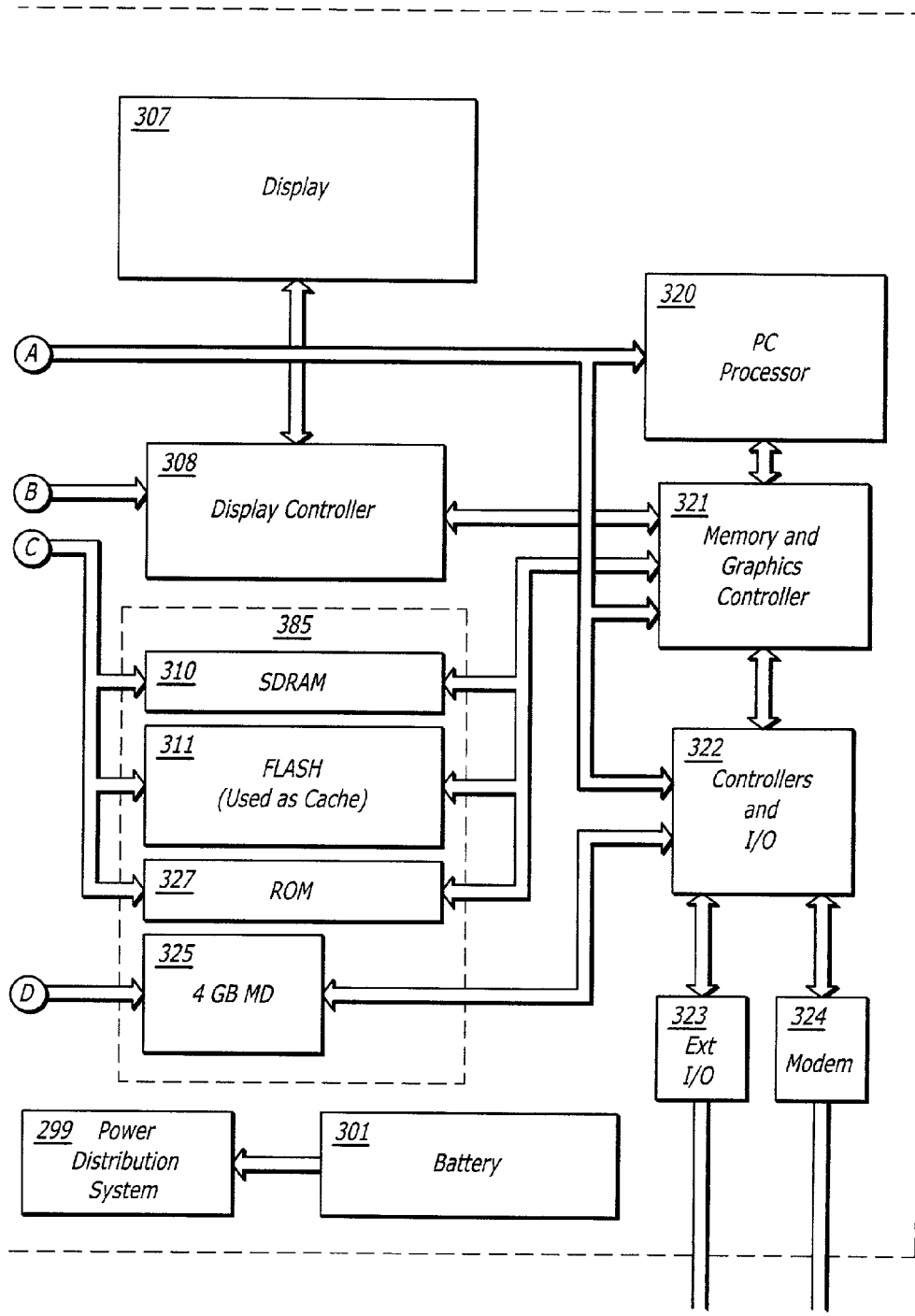

FIG. 3 is a block diagram of one embodiment of the invention disclosed and claimed in application Ser. No. 09/809,963. In this embodiment, a device 300 may include a single battery 301, which serves to apply power to all of the modules contained within device 300. This power is applied via power distribution system 299. System 209 is of a type well known to those of ordinary skill in the art and will not be discussed in further detail in this application. In one embodiment, battery 301 may be a lithium polymer battery, for example of 4.5 to 6.0 ampere hour capacity, such as is available from Valence Corporation.

Device 300 includes a system processor 302, which in one embodiment has lower power requirements, and is capable of performing more limited functions, than a standard computer processor. In one embodiment in the system disclosed and claimed in application Ser. No. 09/809,963, in order to achieve this lower power requirement, system processor 302 is an embedded processor, having a simplified and embedded operating system contained within its on-chip memory. One such embedded processor suitable for use as the system processor 302 is the StrongArm® 1110 Embedded Processor available from Intel®. Processor 302 serves as a system controller for the entire electronic device 300.

System processor 302 includes a number of components as is more fully described, for example, in the Intel® StrongARM® 1110 Technical White Paper, such that system processor 302 is capable of handling contact management, scheduling, and email tasks, as is known in the art, for example in the Hewlett Packard® (HP) Jornada® PocketPC® (CE) device. In this exemplary embodiment, system processor 302 controls telephone module 390, which serves to provide cellular telephone communications by utilizing any one or more communications standards, including CDMA, TDMA, GSM and the like. Telephone module 390 includes signature identification module SIM 302-1, digital signal processor (DSP) 303, and RF module 306.

DSP 303 receives audio input via microphone 304 and provides audio output via speaker 305. The operation of telephone module 390 is well known in the art and will not be further discussed in detail in this application. In one embodiment, SIM 302-1 is a unique identification encrypted device available from Xircon Company, with DSP 303 being the digital signal processor (DSP) device, and RF module 306 being the radio frequency (RF) device. These components can be purchased, integrated into a GSM module, for example the CreditCard GPRS available from Xircom Corporation. In one embodiment, SIM 302-1 is interchangeable so that a user's phone number does not have to be changed when migrating to device 300 from a standard cellular telephone.

System processor 302 also serves to control display 307, which may have any suitable display technology, for example LCD. In one embodiment, display 307 is a LCD Thin Film Transfer (TFT) Reflective Touch screen Reflective, front-lit display, such as manufactured by Sony® Corporation and used in the iPAQ® 3650 PDA device. In one embodiment, display 307 has a resolution of 150 dpi with 65,836 colors available, and is a half SVGA 800×300 dpi. In one embodiment, an aspect ratio 800×600 is provided but only a fraction of the height (for example only the upper half or lower half) of the actual image is displayed, with jog dial or touch screen control used to scroll to the upper or lower half of the screen not in view. Display 307 is controlled by display controller 308, which serves to receive display information from system processor 302, and from processor 320, via memory and graphics controller 321.

System processor 302 instructs display controller 308 as to which display signal source is to be used, i.e., that from System Processor 302 or that from memory and graphics controller 321. System processor 302 also controls touch screen 309 and jog dial module 319. Touch screen 309 serves as a user input device overlaying display 307, and is, for example, an integral part of the device from Sony® Corporation. Jog dial module 319 receives user input applied to the touch screen and converts these analog signals to digital signals for use by system processor 302.

Device 300 also includes processor 320, which performs tasks requiring greater processor power than is available in system processor 302. For example, in one embodiment processor 320 can access typical computer programs such as: Window® ME and programs running under Windows® ME, such as Word®, Excel®, PowerPoint®, and the like. In one embodiment, computer processor 320 is a Transmeta Crusoe® processor operating at 500 megahertz. In an alternative embodiment processor 320 is an Intel® Mobile Pentium III® operating at 300 to 500 megahertz.

Processor 320 is not used for simpler tasks, which are handled more effectively by system processor 302, particularly with respect to power consumption in system processor 302 and without the need of system processor 320 to be awakened from sleep. Through the use of dual processors 302 and 320, and thus dual operating systems, the invention disclosed and claimed in application Ser. No. 09/809,963 overcomes the inability to reliably "wake up" from a memory based "sleep mode." By using the embedded operating system of processor 302 and associated embedded software applications for the highly used "simple applications," processor 320 is not frequently required to wake up. Processor 320 is "awakened" only to perform non-simplistic applications and is "awakened" by signals from the hard disk in the processor 302 rather than by signals from a volatile memory in the processor 320.

Such tasks which are, in certain embodiments, performed by system processor 302 rather than computer processor 320 include the control of telephone module 390, the control of display 307, interfacing with touch screen 309 jog dial module 319 and display controller 308, as well as interfacing with memory devices 310 and 311, during operation of telephone module 390. In certain embodiments, system processor 302 also performs additional features suited to its relatively low level of computational ability and low power requirements, such as interfacing with hardware elements contained within accessories module 371. Such operations include, for example infrared remote control operations using IR module 371-3, for example, for use with entertainment devices.

In one embodiment, remote control module 371-3 interfaces with system processor 302 is a universal remote control device available from Sony Corporation. In such embodiments system processor 302 also performs features associated with accessory module 371-1 which, in one embodiment, is a wireless LAN mobile 802.11 device available from 3Com Corporation and, in other embodiments, operation of Bluetooth® module 371-2, for example, for cordless headset, and cordless telephone and operation with a cordless telephone base station (not shown) connected to a landline and communicating with device 300 via Bluetooth®.

In one embodiment, Bluetooth® module 371-2 interfacing with system processor 302 is a wireless device available from Philips Corporation. Such other functions which system processor 302 performs via the accessory module 371 include operation of GPS module 371-4, in order to provide detailed and accurate positioning, location, and movement information and the like as well known to those familiar with GPS systems. In one embodiment, GPS module 371-4 is a compact flash card device available from Premier Electronics. The built-in GPS can be utilized to determine the latitude and longitude of device 300. This information can be supplied to software applications such as those which provide driving instructions and eCommerce applications that associate consumers and merchants via latitude and longitude for online ordering, such as the application service provider (ASP) food.com.

In one embodiment, accessory module 371 interfacing with system processor 302 includes IRDA module 371-5, which is used for point to point wireless IR communications, which in one embodiment is an integrated transceiver device available from Novalog Corporation. In one embodiment, accessory module 371 includes home RF module 371-6, which serves to provide access to a pre-existing 2.4 Ghz home wireless communication network, and which, in one embodiment, is a 2.4 Ghz wireless device available from WaveCom Corporation. In one embodiment Bluetooth and PC synchronization functions between system 300 and other PC computing devices that have utilized the Bluetooth® technology as their wireless interfaces.

In certain embodiments, system processor 302 also performs more sophisticated tasks, yet tasks which are well suited to its level of computational ability, which is less than that of processor 320. Such tasks include, for example, Window® PocketPC® (CE), and programs which may be run under Windows® PocketPC® (CE), for example running display 307 during the telephone mode, and Pocket Outlook®, including email, contact management, and scheduling.

In the embodiment shown in FIG. 3, memory and storage module 385 serves as a shared resource module which may be shared by system processor 302 and processor 320. The processor 320 may access(es) memory and storage module 385 via memory and graphics controller 321. Memory and storage module 385 may include, in this exemplary embodiment, ROM 327 which may serve to store the embedded operating system. In one embodiment, Microsoft® Pocket PCW (CE), SDRAM 310 may serve as the main memory for devices 302 and 320 for use by computer programs running on their respective operating systems. In this embodiment, flash memory 311 may be used as an application cache memory. In this embodiment, hard disk drive 325 may be a 4 gigabyte micro-drive such as is available from IBM Corporation. In an alternative embodiment, hard disk drive 325 may be a semiconductor device which emulates a hard disk, such as is available from Sandisk Corporation. In one embodiment, SDRAM 310 may provide 64 to 256 megabytes of FLASH memory, such as is available from Samsung Corporation. In one embodiment, the available memory may be shared but specific memory addresses are not shared. Memory address blocks are not shared or made available to both system processor 302 and computer processor 320 at the same time.

Utilizing hard disk drive 325 as a shared resource between system processor 302 and processor 320 provides an enormous data storage capacity available for both processors and eliminates the data storage limitation normally encountered when using a typical prior art PDA or a similar device utilizing an embedded processor with a limited amount of semiconductor memory. In one embodiment, hard disk drive 325 may be artificially partitioned for Microsoft® PocketPC® (CE) data storage space. In another embodiment, hard disk drive 325 may share the file systems between the two operating environments by protecting certain operating environment files but still allowing for the use of shared files when appropriate.

Operating with processor 320 are memory and graphics controller 321, such as Intel® 82815 graphics memory controller hub (GMCH) device, and controller and I/O module 322, for example an Intel® 82801 integrated controller hub (ICH) device. This device provides IDE and PCI controller types of functions, as well as a USB output port suitable for use such as connecting to the 601 module as a docking strip or connecting to module 700 as a slave unit to an existing PC. In an alternative embodiment, controller and I/O module 322 is an Intel® 82801 ICH device operating in conjunction with an Intel® WA3627 device, which provides additional peripheral device attachments such as floppy drives, additional hard disks, CD-ROMS, DVD'S, external mouse, keyboards and external monitor integrated in a combination as to form as to comprise module 800 as the docking station functionality. Controller and I/O module 322 serve to interface processor 320 with various I/O devices such as hard disk drive 325. Other I/O modules include modem 324, and other external I/O devices controlled by external I/O controller 323. Such other external I/O devices include, for example, keyboard, CD ROM drive, floppy disk drives, mouse, network connection, and so forth.

In one embodiment of the invention disclosed and claimed in application Ser. No. 09/809,963, system processor 302 serves as the overall power manager of device 300. Thus, system processor 302 determines when processor 320 will be on and when it will be in its sleep mode. In one embodiment, system processor 302 determines the operating speed of processor 320, for example, based on the tasks being performed by processor 320, the charge on battery 301, and user preferences.

As part of its power management tasks, system processor 302 determines which components related to processor 320 will be turned on when processor 320 is in operation. Thus, processor 320 can be operating while one or more of external I/O controller 323, modem 324, and hard disk drive 325 are disabled because those devices are not necessary for the tasks at hand, thus saving power and extending the useful life of Battery 301. As part of the power management operation, system processor 302 also determines when display 307 is illuminated, when telephone module 390 is powered up, and the like.

Many of the power management decisions are driven by the user's desire to perform a specific function. For example, in one embodiment, to access Microsoft® Outlook® the following events occur to minimize power requirements, system processor 302 powers up only processor 320 and memory and graphics controller 321. In this manner, FLASH memory 311 and SDRAM 310 are accessed via memory and graphics controller 321. Memory and graphics controller 321 manages the graphics display of Outlook®, and the Outlook® executable and data file are read from FLASH memory 311 and/or SDRAM memory 310. If the user alters the Outlook® data file in FLASH memory 311 and/or SDRAM memory 310, such as by adding a new contact, then system processor 302 in conjunction with memory and graphics controller 321 writes the updated information back to FLASH memory 311 and/or SDRAM memory 310. When the user exits Outlook®, system processor 302 writes all necessary data back to FLASH memory 311 including any data elements residing in SDRAM memory 310.

The following chain of events will then occur:
1. System processor 302 attempts to wake up processor 320.
2. If processor 320 cannot be awakened due to undesirable conditions determined by system processor 302 and PC elements 320, 321, 322, 323, and 325 (which are now powered up).
2.1 A re-boot of processor 320 is initiated.
2.2 The PC module reboots Window® 320 ME in the background. Once the reboot has been completed, then the updated Outlook® data residing in FLASH memory 311 is written to hard disk version of the data file in Outlook®.
2.3 Once the reboot has been completed, then system processor 302 returns processor 320 to sleep mode.
3. On the contrary, if the PC module can be awakened, the updated Outlook® data residing in FLASH memory 311 is written back to the Outlook® data file residing on hard disk drive 325.
4. System processor 302 returns processor 320 to sleep mode.

As another feature of power management, system processor 302 manages the duty cycle of display 307. For example, user input to the touch screen results in display 307 power up. The user then taps the cell phone icon on the main menu and the keypad application is invoked by loading from FLASH memory 311. The user taps in a phone number to call and taps the "Send" button. The application dials the phone number stating "Dialing Number . . . " and connects the call displaying "Call Connected." The application messages to system processor 302 that the call has been completed and transaction complete. System processor 302 waits for a period of time, for example 3 seconds, then powers down display 307 to conserve power. System processor 302 then is in its "standby" mode, idling and waiting for user input or an incoming call to "wake up."

Figure 4A:
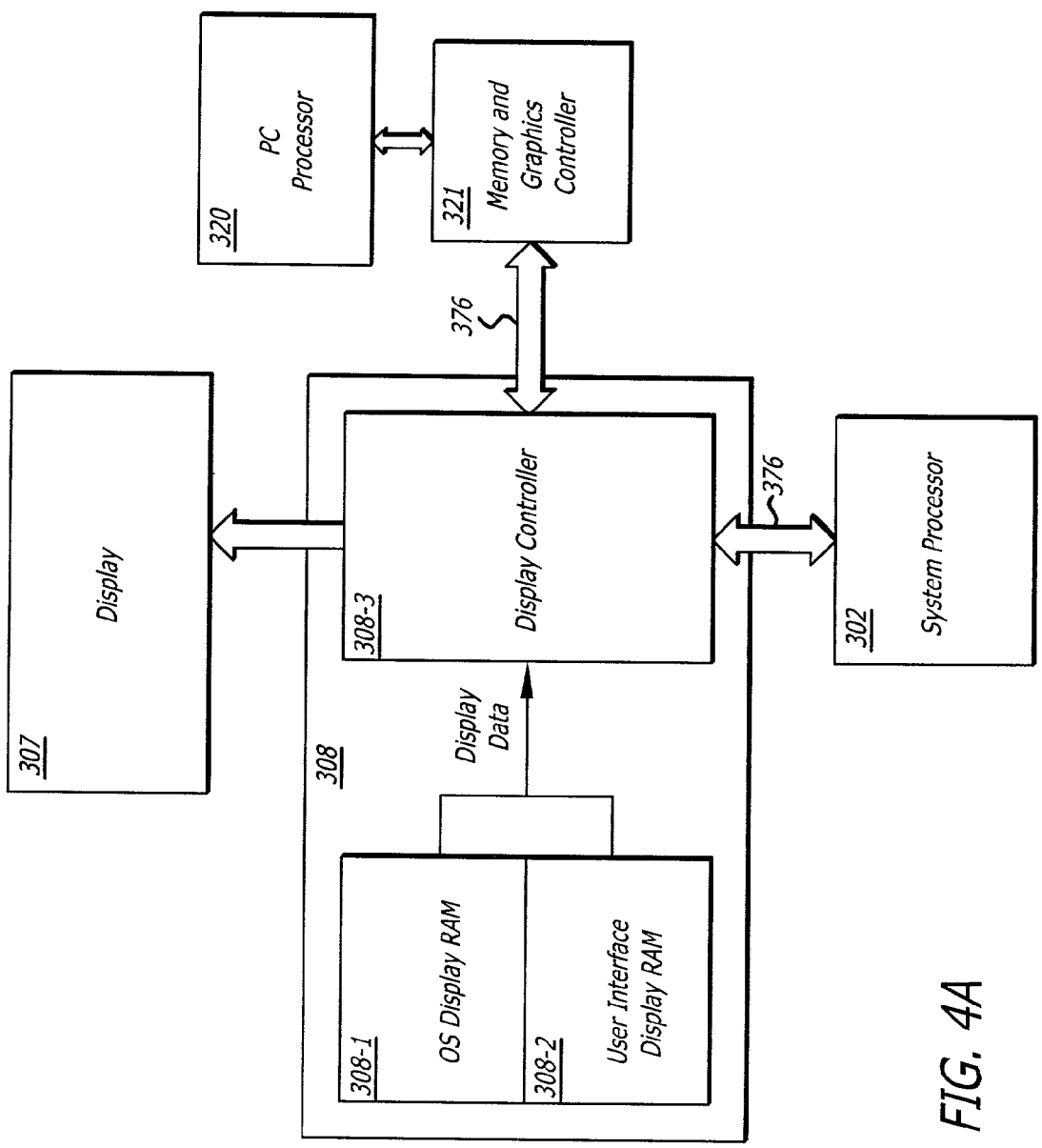
FIG. 4A depicts a detailed diagram of one embodiment of a display controller 308 of FIG. 3.

FIG. 4A is a block diagram depicting in more detail display controller 308. Shown for convenience in FIG. 4A is also system processor 302, memory and graphics controller 321, and display 307. In one embodiment, display controller 308 includes memory, which includes two portions, Windows® DISPLAY ram 308-1 and user interface display RAM 308-2. Memory 308-1 and 308-2 is, in one embodiment, a dual ported RAM allowing communication with both system processor 302 and memory and graphics controller 321. In an alternative embodiment, memory 308 is not dual ported, but rather is divided into two portions of high speed synchronous RAM, with system processor 302 and processor 320 being allocated their own separate portions of RAM 308.

Windows® display memory 308-1 receives from both system processor 302 and processor 320, as appropriate, the frame data, which forms part of the definition of the image to be displayed on LCD 307. User interface display RAM 308-2 receives from system processor 302 and processor 320, as appropriate, pixel data for use with the frame data stored in the Windows® display RAM 308-1, which will complete the information needed to provide the desired display on display 307. Display controller 308-3 serves to retrieve data from Windows® display data RAM 308-1 and user interface display RAM 308-2 to provide the desired display on display 307. Display controller 308-3 communicates with system processor 302 via control bus 375 and also communicates with memory and graphics controller via control bus 376.

Figure 4B:
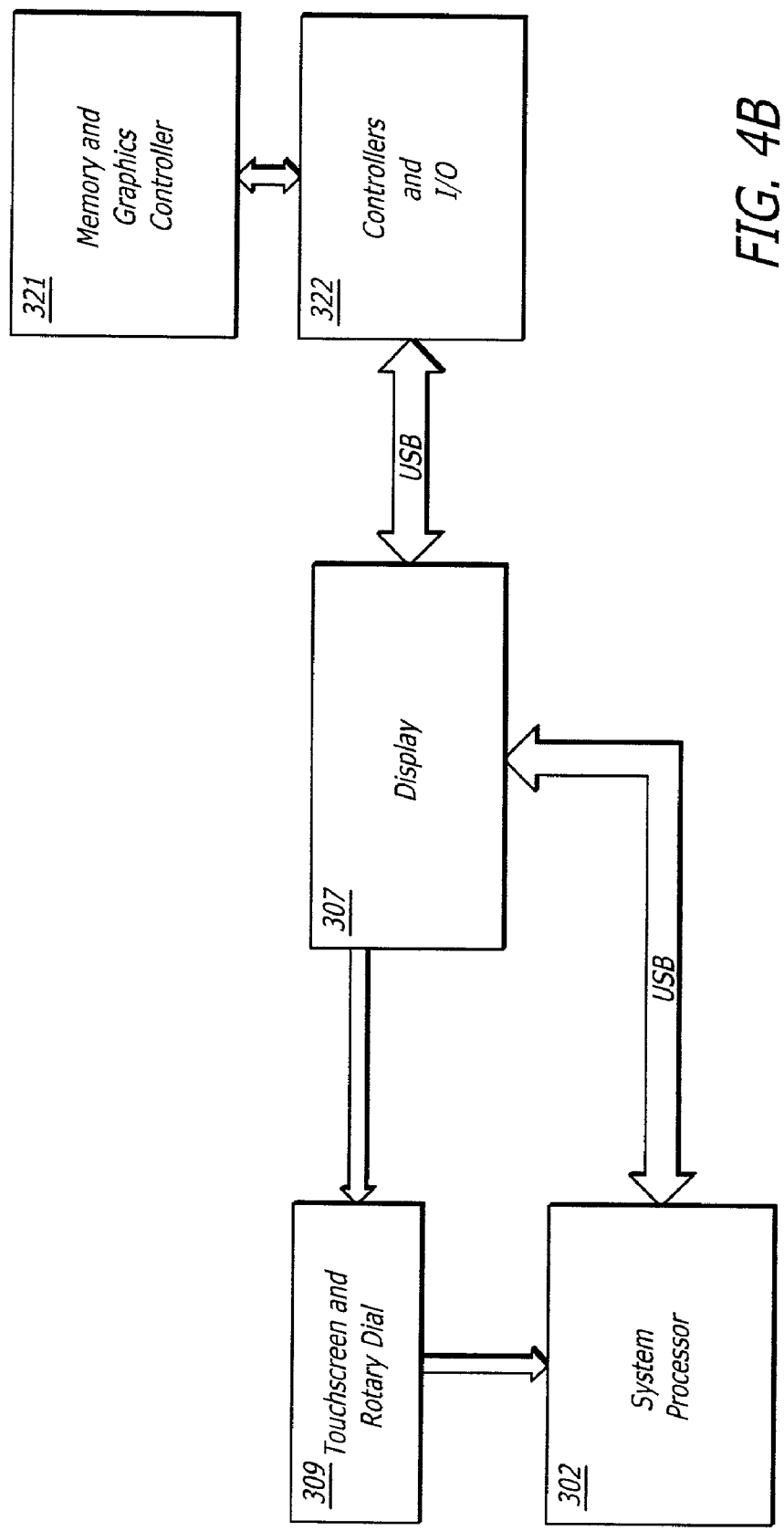
FIG. 4B depicts an alternative embodiment of a display 307 of FIG. 3.

FIG. 4B is an alternative embodiment in which system processor 302 and memory controller 321 communicate with display 307 by utilizing separate display controllers contained within system processor 302 and memory controller 321, respectively. In this embodiment, display controller 401 is provided, which includes a selection circuit operating under the control of system processor 302 for selecting video display signals received from the display controller contained in system processor 302 or, alternatively, signals from the display controller contained in controllers and I/O module 322, under the control of memory and graphics controller 321. For example, when system processor 302 is an embedded StrongARM® 110 processor device available from Intel®, it contains its own display controller with USB input/output (I/O).

Similarly, graphics and memory display controller 321, which in one embodiment is an 82801 GMCH device available from Intel®, communicates with I/O module 322, which in one embodiment is an 82801 ICH device available from Intel® having its own USB output as well. In this embodiment, universal serial bus (USB) connections provide communications between system processor 302 and display 307, and between controllers and I/O module 322 and display 307. In this embodiment, the processing of display data occurs within controllers residing in devices 302 and 321. In this embodiment, display controller 401 acts as a switching device, not a processing device, between the two controllers described above.

As a feature of certain embodiments of the invention disclosed and claimed in application Ser. No. 09/809,963, device 300 operates by using two processors, each utilizing its own operating system. This allows device 300 to take advantage of the "best of breed" from both embedded and non-embedded operating environments. For example, the embedded operating system of system processor 302 is self-contained, and the software applications that run within the embedded operating environment are considered "closed." Specifically, in a "closed" environment, the software used is specified by the developer of the embedded system and may not be upgraded or modified by the user of the embedded operating system. In addition, no new software may be introduced to the embedded system by the user; the Microsoft® PocketPC® operating system and Microsoft® Outlook® for the PocketPC® are respectively examples of a "closed" embedded operating system and a "closed" embedded software application residing in a "closed" environment.

The ability to debug and test an embedded system without the concern of a user introducing to the system new software or modifications, or patches (which could introduce bugs or viruses to the embedded system) make the ability to create a stable operating environment much easier by orders of magnitude, compared to an "open" software environment. Therefore, by definition, an embedded operating environment is inherently more reliable and stable than a non-embedded operating environment for the reasons described above.

Device 300 has been designed to take full advantage of the "closed" embedded environment by using an embedded operating system and embedded software applications that are considered to be "simple" and "high-use" applications, as it regards duty-cycle usage. More importantly, device 300 has been designed to take full advantage of the "closed" embedded environment for such functions as cellular telephone calls, scheduling appointments, sending and receiving email, and web browsing. In addition to the reliability benefits, which are tremendous, the embedded environment has dramatically lower power consumption, when compared to processor 320 and its related components, if used to perform the same tasks.

Conversely in an "open" software operating environment, such as in the case with the PC module (processor 320 and its related devices 321, 322, and 325), the user is free to add, modify and delete software applications and data files at will. Device 300 has also provided to the user an "open" operating environment, with an industry standard operating system, allowing for the use of industry standard software. The user of device 300 is free to load and manipulate software and data files that reside in the "open" operating environment of the PC module without fear of corrupting the core functionality of the entire device. The "open" environment provides a tremendous amount of PC use flexibility. However, unfortunately, since there is no guarantee of compatibility between the new software being introduced or modified in the "open" environment, or no guarantee of compatibility between the new software and the previously provided software, it increases the possibility of system failures. This is one reason why, in addition to greater power consumption, the PC module 320 is not used as the system processor/controller exclusively in device 300.

In one embodiment, voice command and control are provided in one or both the embedded operating environment of system processor 302 and non-embedded operating environment of processor 320. When used in both operating system environments, a seamless voice command and control user experience is achieved, regardless of the operating mode of device 300. In one embodiment, voice recognition is provided as well, for example by way of voice recognition software run by processor 320.

Power management is significant in that device 300 includes a number of elements which need not always be powered. By selectively powering down certain elements, the useful life of battery 301 is extended considerably. Table 1 shows, by way of example, a variety of functions and the associated power management scheme for various modules. For example, in one embodiment while mobile and using power available via battery 301, the Microsoft® PocketPC® (CE) operating system is used in conjunction with system processor 302, memory 310, ROM 327 (containing for example BIOS), and hard disk drive 325 for the major computing tasks. Computing tasks for use in this mode typically include email, contact management, calendar functions, and wireless browsing. In this operating environment, power is managed by putting the other modules into a sleep mode or turning them completely off.

Synchronization of the data files between the embedded Microsoft® PocketPC® (CE) and the Windows® ME PC modules is accomplished by turning the PC module "on" and using customized synchronization software to update the Windows® ME PC module data files. There are certain user functions that are shared between the two operating environments of Microsoft® PocketPC® (CE) and Microsoft® Windows® ME. These functions include, but are not limited to, for example, the Outlook® data file, which includes contact management, email and calendar data, and favorite site data, stored in Microsoft® Internet Explorer® (IE).

The applications that are used to perform the functions described above are redundant in that they exist within each operating environment. These applications, although identical in functionality, are, from a software architecture perspective, dramatically different in nature and have been programmed to maximize their use in each environment. Specifically, the embedded version of Outlook®, in the Microsoft® PocketPC® (CE) operating environment, for example, has been optimized with the smallest footprint in memory in order to operate the application in an environment having a less powerful processor and limited memory. Such is not the case with the Microsoft® Windows® ME Outlook version, where a complete Windows object library is used to construct the Outlook application. If redundant or unused object functionality is loaded and processed into memory, the inefficiencies are ignored because since the PC processor is so fast, there is no cost benefit to optimization. In accordance with the invention disclosed and claimed in application Ser. No. 09/809,963, in order to ensure the best user experience and maintain the highest level of functionality, such application data is seamlessly and silently updated and synchronized between the two operating systems and applications.

FIG. 5 is a diagram depicting one embodiment of the present invention, including jog dial 319, RJ11 Jack 502 for connection to, for example, a telephone line or network interface, and USB connection 323. In addition, microphone 304 and speaker 305, infrared for remote control and data synchronization 504, display 307, antenna 510, an power on/off are shown.

Figure 6:
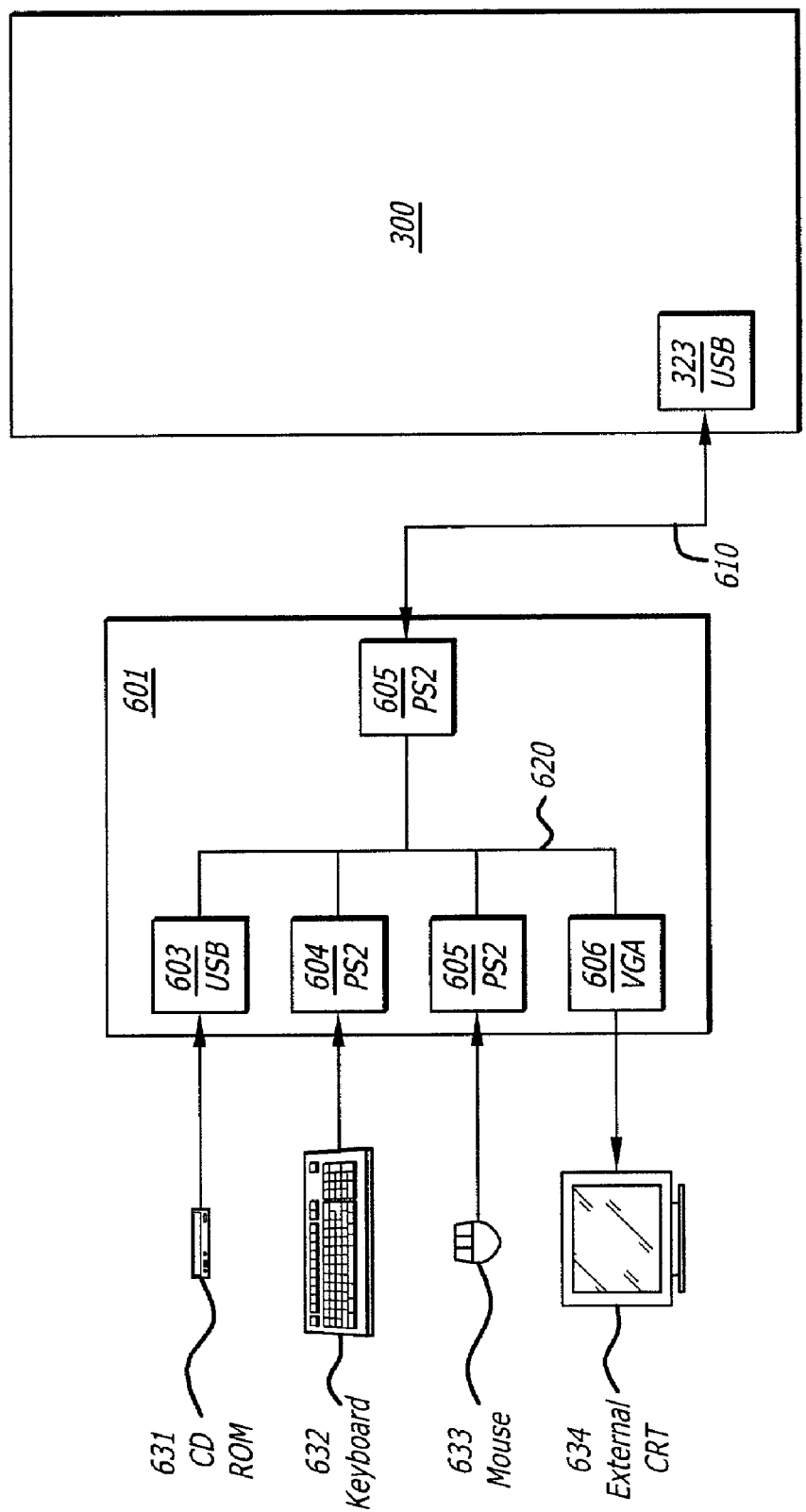
FIG. 6 is a block diagram depicting one embodiment in which the novel personal electronic device disclosed and claimed in application Ser. No. 09/809,963 is used in conjunction with external computer accessories.

FIG. 6 is a diagram depicting device 300 in use with external computer accessories, for example, when the user arrives at a home or business office and wishes to use more conventional I/O devices. In this environment, device 300 includes universal serial bus (USB) interface as external I/O interface 323. Docking strip 601 serves to interface between external I/O modules and device 300. As shown in FIG. 6, docking strip 601 includes a multi-port USB hub 602 which communicates via USB cable 610 with device 300. Multi-port USB hub 602 in turn interfaces to various external I/O interfaces, shown in this example as (a) USB interface 603, which is connected to, for example CD ROM drive 631, (b) PS/2 interface 604, which is connected to, for example keyboard 632, (c) PS/2 interface 605, which is connected to, in this example, mouse 633, and (d) VGA interface 606 which, in this embodiment, is connected to external CRT or LCD video display 634.

In this fashion, the simple, low power device 300 is able to be easily, and inexpensively, connected to a wide variety of external, and more conventional I/O devices, some examples of which are shown in the embodiment of FIG. 6. In one embodiment, docking strip 601 receives what little power requirements it has, via USB cable 610 from device 300. In this embodiment, certain external I/O devices such as CD ROM drive 631 and display 634 receive their power from the AC supply, thereby not adding to the power requirements which must be met by device 300.

Figure 7:
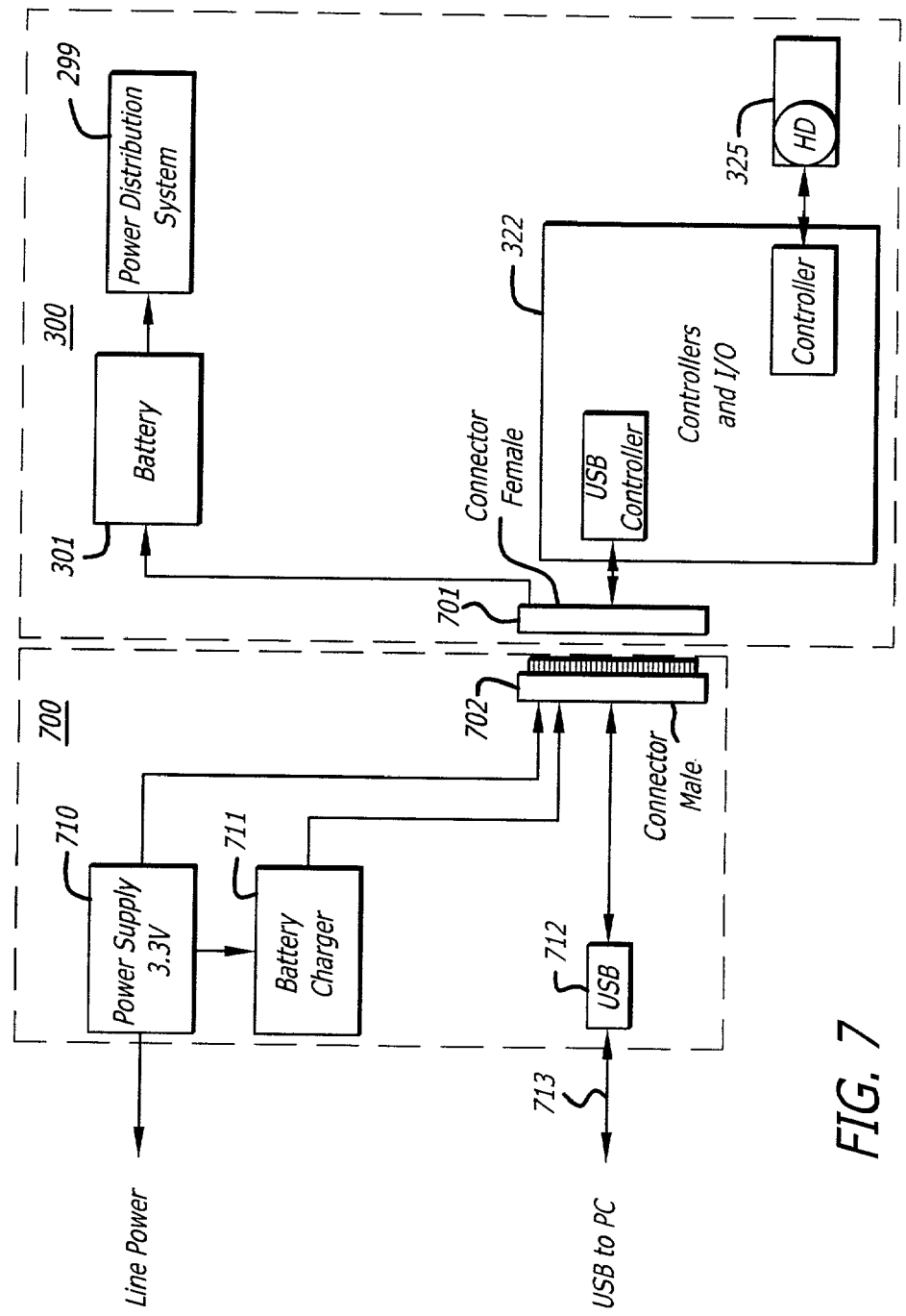
FIG. 7 is a block diagram depicting one embodiment in which the personal electronic device of the invention disclosed and claimed in application Ser. No. 09/809,963 is used in connection with a conventional computer through the use of a slave unit.

FIG. 7 is a diagram depicting device 300 in use with another computer system (not shown) so that, for example, the other computer system is able to access the memory and data storage elements of device 300. This is useful, for example, when a traveler returns to a fixed location, such as home or work office, hotel room, and so forth, and desires to utilize a standard computer system (which might include a network connection) to access the data within device 300. Conveniently, during this operation, battery 301 of device 300 can be recharged.

Referring to FIG. 7, slave unit 700 serves to interface between a conventional computer (not shown), for example via USB cable 713, and device 300. In one embodiment, device 300 includes a connector 701, which serves to mate with connector 702 of slave unit 700. Such connectors are well known in the art. Slave unit 700 also includes power supply 710 and battery charger 711 (which in one embodiment are conveniently constructed as a single module), which receives power from an external power source and provides power, via connector 702 to connector 701 in order to charge battery 301 within device 300. This battery charging is conveniently performed while the external computer system is accessing the memory and storage device (such as hard disk drive 325) within device 300.

Figures 1, 8:
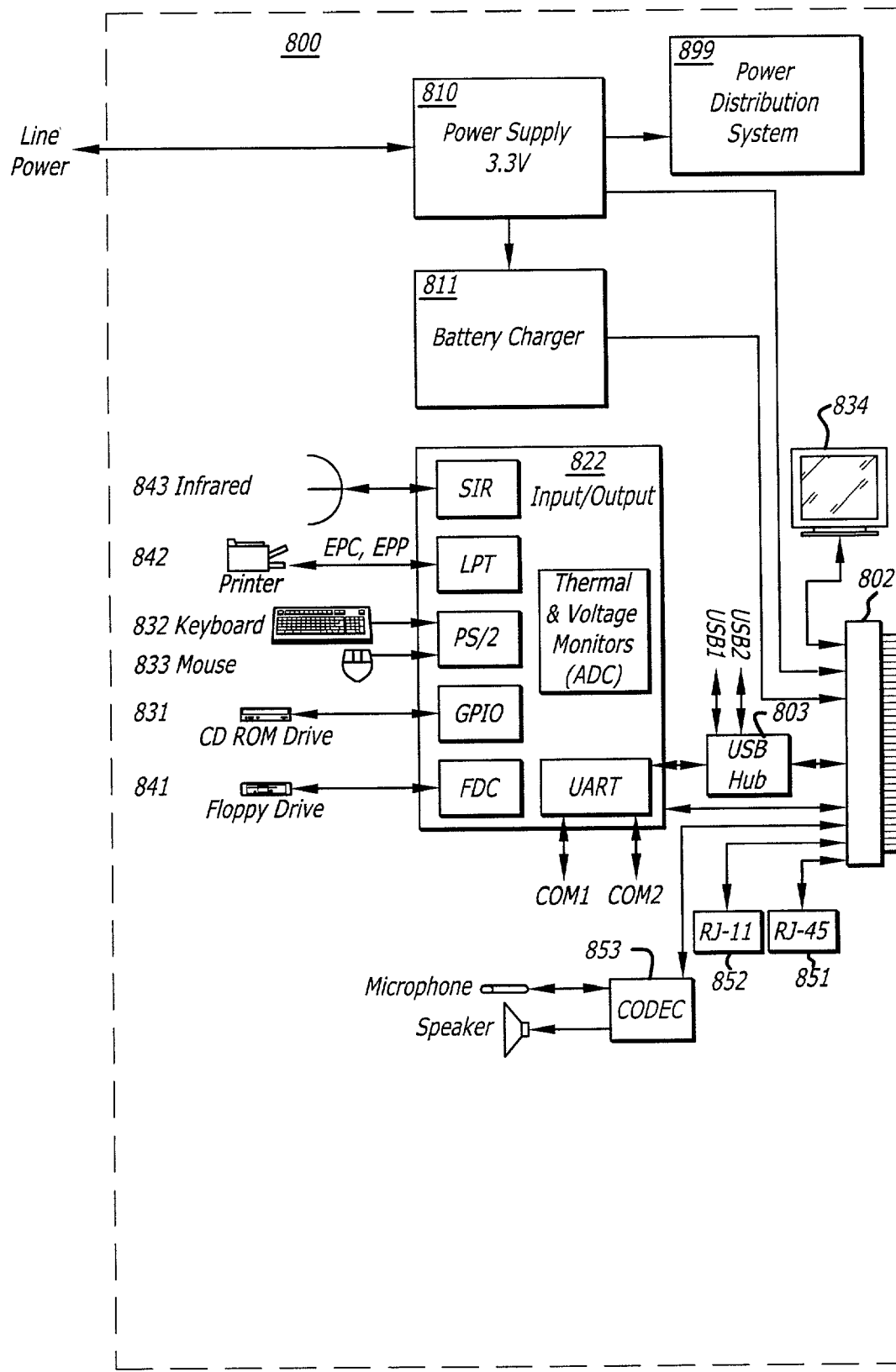
FIG. 8 is a diagram depicting one embodiment of the invention which is disclosed and claimed in application Ser. No. 09/809,963 and which includes a personal electronic device in conjunction with a docking station.
Figures 2, 8:
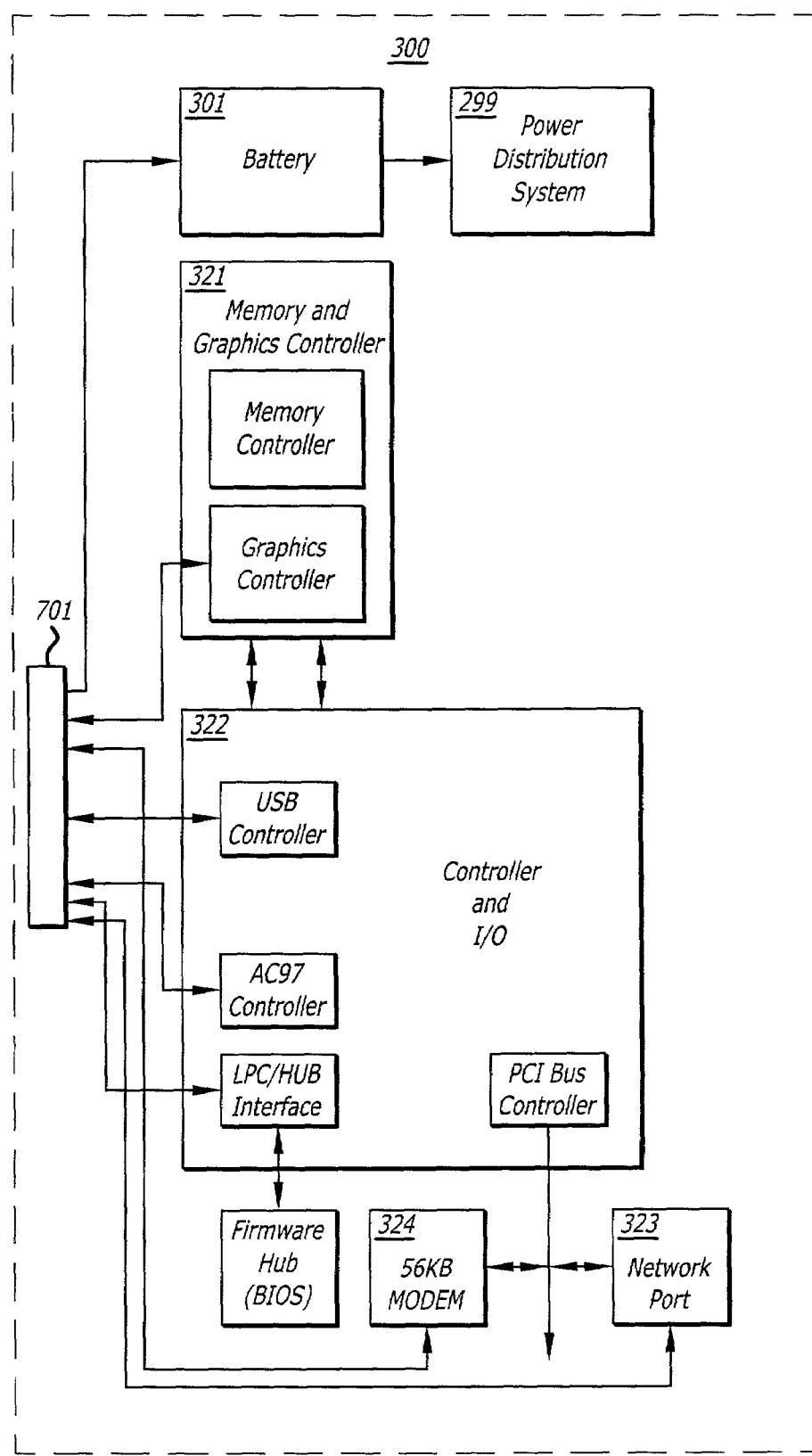

FIG. 8 is a block diagram showing one embodiment of a docking station 800 for use with device 300. Various elements contained within device 300 are shown, which have particularly relevance to interconnection with docking station 800. Also shown within device 300 is a network port (for example, Ethernet port) serving as external I/O interface 323. Docking station 800 includes connector 802 for connection to device 300 via its connector 701. In one embodiment, docking station 800 includes power supply 810 and battery charger 811, which in one embodiment are fabricated as a single module and which receive power from an external source in order to supply docking station 800, as well as provide battery charging current to device 300.

Docking station 800 includes, for example, an external CRT or LCD display 834 and USB hub 803 for connection with device 300 controller and I/O module 322. USB hub 803 connects to docking station I/O module 822 and other USB devices (not shown), if desired. Alternatively, I/O module 822 of docking station 800 is connected to device 300 via LPC bus 862 as an alternative interface. Other types of interfaces can be used as well. I/O module 822 serves to communicate with device 300 and various I/O modules shown, by way of example, as infrared I/O module 843, printer 842, keyboard 832, mouse 833, CD ROM drive 831, and floppy drive 841. Any other desired I/O modules can, of course, be used in a similar fashion.

In the embodiment shown, external I/O module 323 of device 300 is a network port, for example an Ethernet port. This network port is coupled via connectors 701 and 802 to network connection 851, allowing device 300 to be connected to a network. In the embodiment shown in FIG. 8, device 300 includes modem 324 which is connected to a telephone line 852 by a connection through connectors 701 and 802. In the embodiment shown in FIG. 8, docking station 800 includes its own CODEC 853, as well as one or more microphones and one or more speakers, allowing the audio input-output to be performed with elements of docking station 800, rather than integral elements of device 300.

In one embodiment, when device 300 is docked with docking station 800, display controller 308 automatically turns off display 307 and uses the docking station monitor 834. Display controller 308 automatically provides display signals to docking station monitor 834 to provide a full SVGA display of 800×600. If desired, docking station monitor 834 is custom configurable through the use of display controller 308 to set the docking station monitor 834 at higher resolutions.

In one embodiment, when device 300 is docked within docking station 800, telephone module 390 is able to be used concurrently with the landline based telephone connection 852, allowing, for example, a voice telephone call to be made concurrently with a modem connection, and two concurrent (and/or conjoined) telephone connections.

Figure 9:
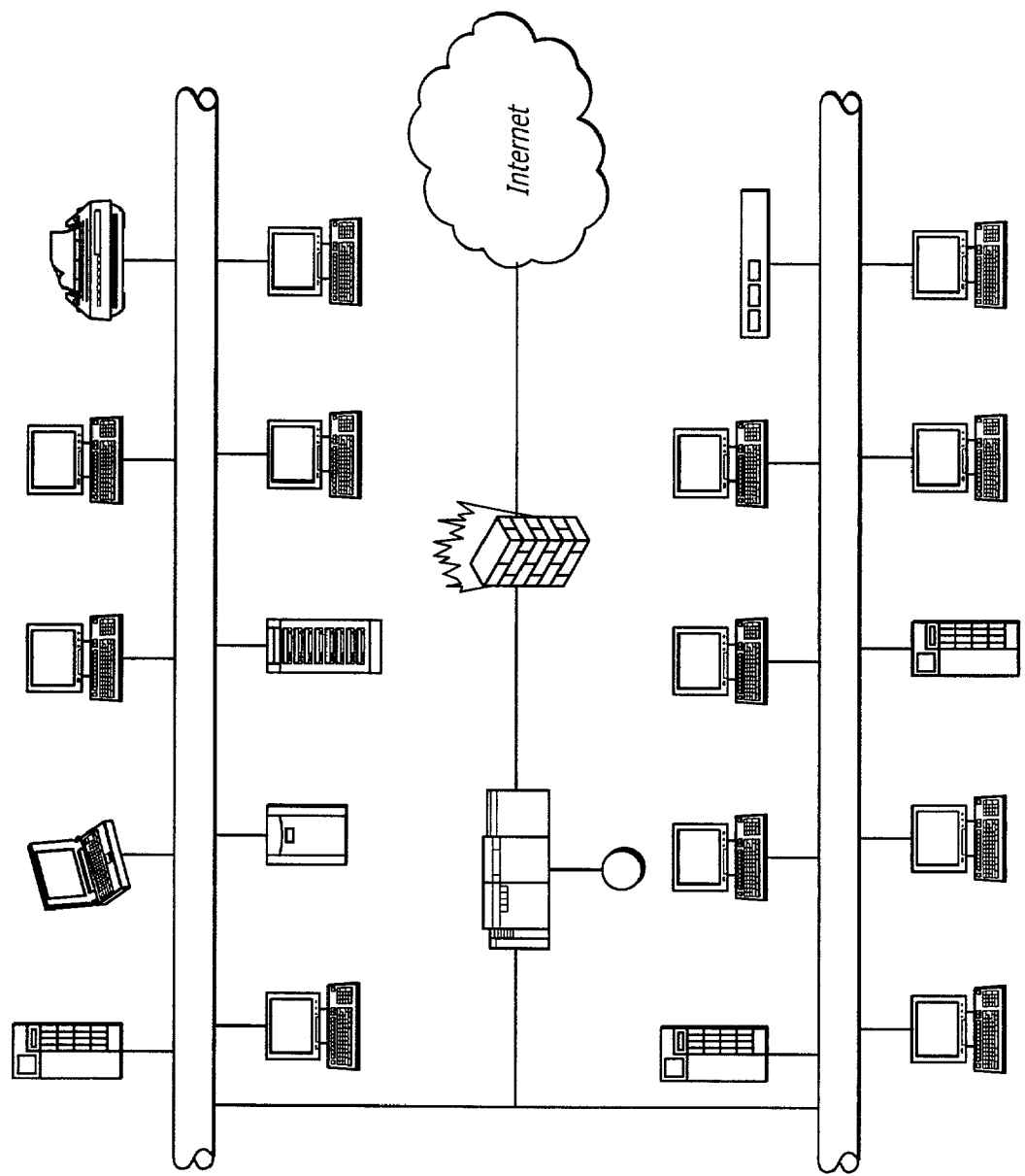
FIG. 9 is a block diagram which depicts one embodiment of a network and which includes one or more personal electronic devices of the invention disclosed and claimed in application Ser. No. 09/809,963.

FIG. 9 is a block diagram depicting a typical local area network (LAN), including one or more personal electronic devices of the present invention, which are connected to the network either directly, or via network drivers contained within the personal electronic device, a network connection contained in docking strip 601, or the network connection provided by docking station 800 of FIG. 8.

Figure 10:
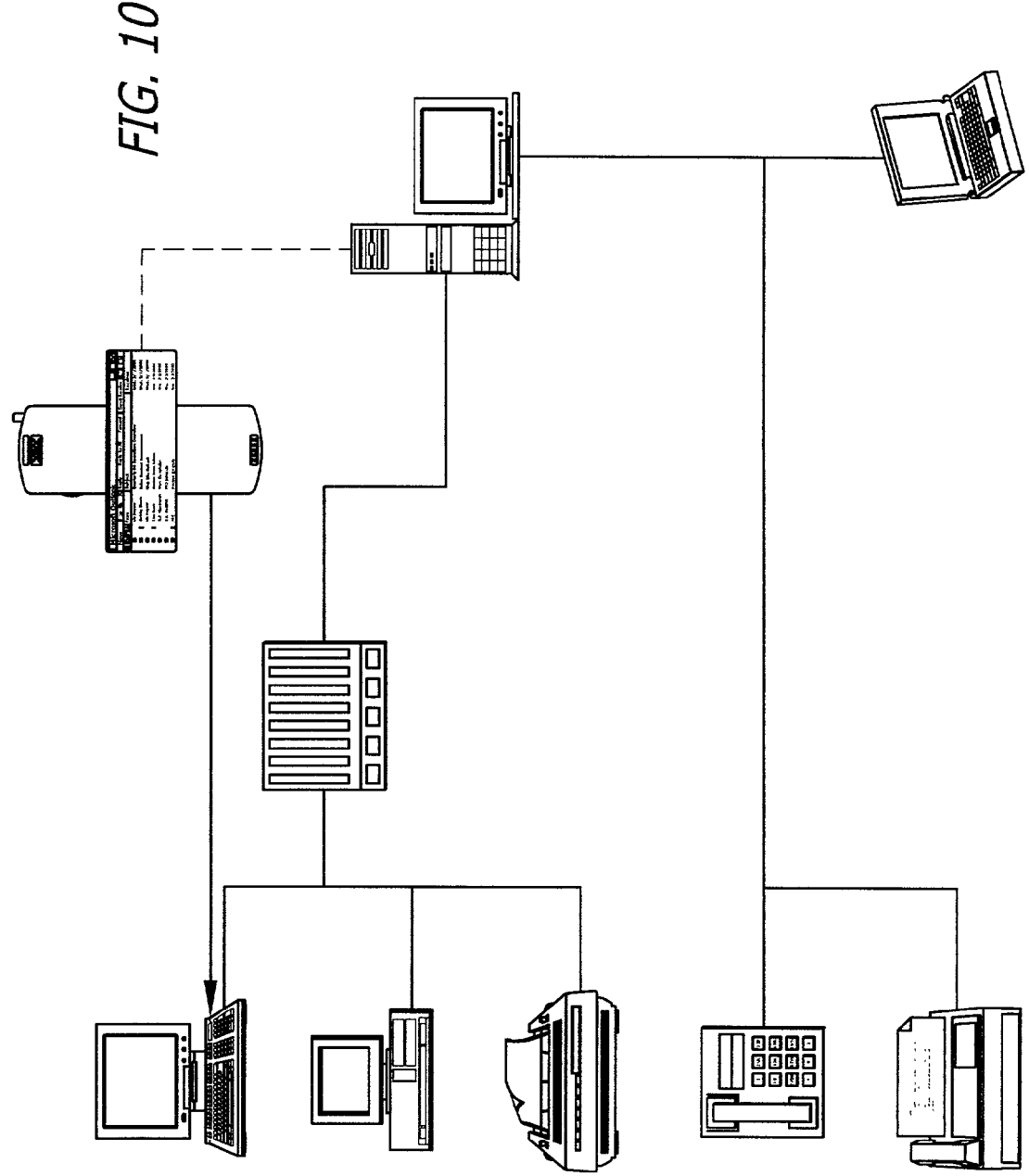
FIG. 10 is a block diagram depicting one embodiment of a home personal network which shows three network subnets such as wireless, Ethernet and phone line new alliance (PNA) and which includes one or more personal electronic devices of the invention disclosed and claimed in application Ser. No. 09/809,963.

FIG. 10 is a diagram of a home network, where there are several different network connectivity examples, such as a wireless 802.11 LAN, a standard Ethernet LAN and a home phone network alliance (PNA) all integrated into one solution for one home network.

Figure 13:
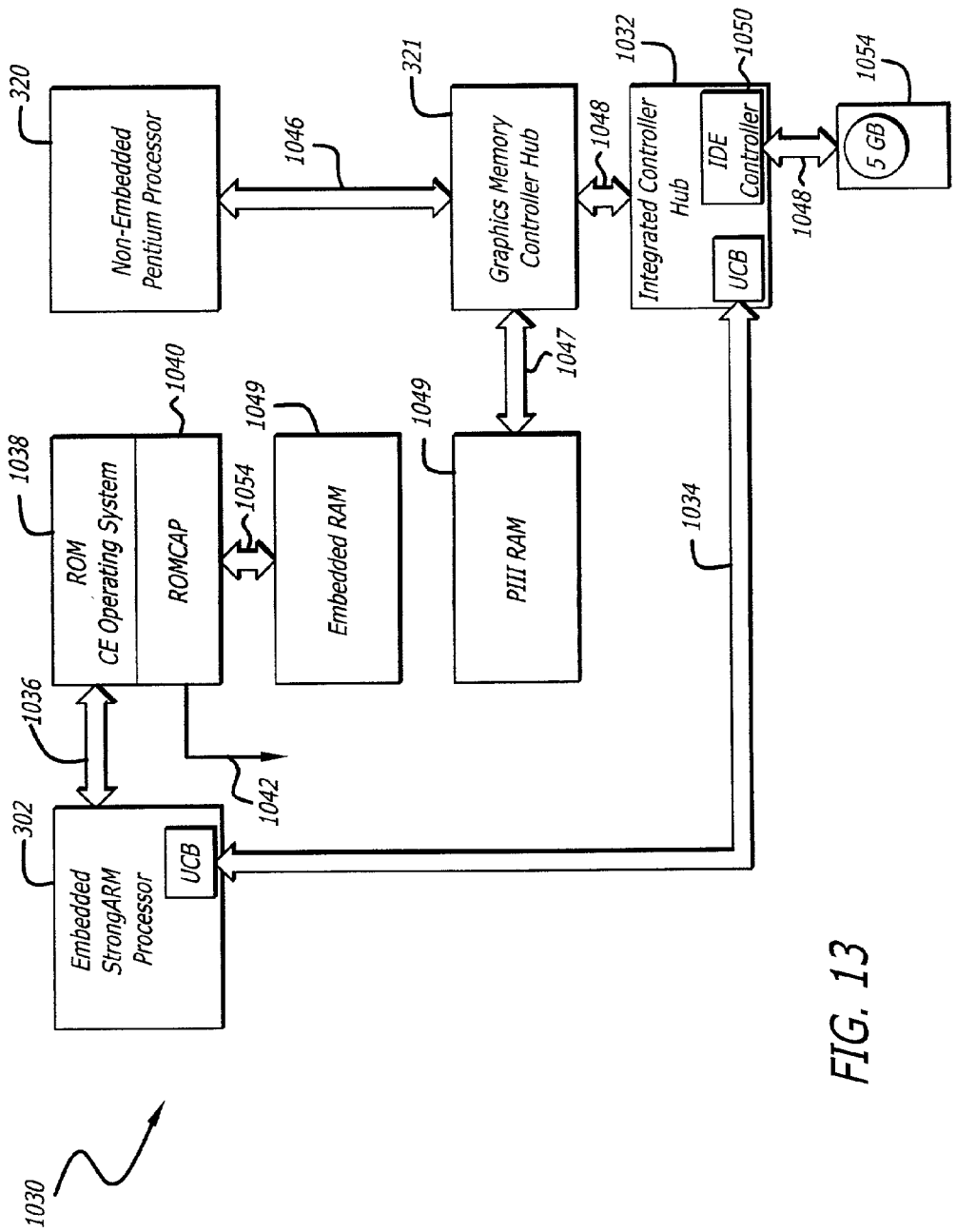
FIG. 13 is a circuit diagram, primarily in block form, showing how stages associated with the embedded and non-embedded processors (a) initially introduce the programs and data to the non-embedded processor, (b) process the programs and data introduced to the non-embedded processor, (c) introduce the processed programs and data to the embedded processor for storage, and (d) thereafter transfer the processed programs and data to the non-embedded processor when the non-embedded processor is awakened and activated to perform the functions represented by the program.

FIGS. 11 and 12 provide common application protocol (CAP) diagrams which constitute flow charts showing the successive steps in a method constituting this invention when this method is used in or with the system shown in FIGS. 1–10. FIG. 13 schematically shows hardware including this invention when the hardware is included in the system shown in FIGS. 1–12.

FIG. 11 shows a common application protocol (CAP) initialization and table association update for introducing protocols to the non-embedded processor 320, processing the protocols and introducing the processed protocols to the embedded processor 302. The start of the process is indicated at 1000 in FIG. 11. As a first step, a non-embedded processor such as the non-embedded Windows® XP processor 320 initializes the communication protocols and makes the processor ready for accepting and receiving data. This is indicated at 1002 in FIG. 11.

The non-embedded (e.g., Windows® XP) processor 320 then makes a list of new extension form registry as indicated at 1004 in FIG. 11. The extension form registry provides a new application protocol which is defined by a series of programs or modifiers and which provide extensions or modifications of an application protocol. If the extension form registry does not exist so that the application protocol is new, the non-embedded processor 320 writes the entire contents of the file into a new extension form registry. If the extension form registry does exist, the non-embedded processor 320 writes the difference between the new extension form registry and the existing extension form registry and the new settings for the extension form registry. This is indicated at 1006 in FIG. 11.

The non-embedded processor 320 then sends the extension form registry file to the embedded (e.g., Windows® CE) processor 302 (see 1008). The embedded processor 302 receives the extension form registry file. If the extension form registry file already exists at the embedded processor 302, the embedded processor 302 removes the existing file and replaces it with the file which the processor has just received. This is indicated at 1010 in FIG. 11.

The embedded processor 302 then parses the file and makes a list of extensions to add and a list of extensions to remove (see 1012 in FIG. 11). The embedded processor subsequently registers the new extensions and resolves the old extensions if these extensions are no longer supported (as indicated at 1014 in FIG. 11). The flow chart in FIG. 11 is ended at 1016.

FIG. 12 is a flow chart indicating the successive steps which are performed when the non-embedded processor 320 is to perform the protocols of the extension form registry recorded in the embedded processor 302 in accordance with the steps shown in FIG. 11 and described above. The start of the successive steps is indicated at 1017.

The user of the embedded processor 302 initially clicks in a file in the processor file system or an email attachment as indicated at 101. The embedded processor 302 then sends to the non-embedded processor 320 the information in the file and the data relating to the file (see 1020). The non-embedded processor receives the file information and the new file data and saves the physical file as indicated at 1022. The non-embedded processor 320 then launches (1024) the file with the appropriate extension form registry application. This is the end 1026 of the steps shown in FIG. 12.

FIG. 13 shows the hardware, generally indicated at 1030, for providing the method steps shown in FIGS. 11 and 12. The hardware 1030 includes the embedded processor 302, the non-embedded processor 320 and integrated controllers 1032. A universal serial bus 1034 extends between the processor 302 and the integrated controllers 1032.

A bus 1036 is connected between the embedded processor 302 and a read-only memory 1038 for the embedded processor operating system. Since the processor 302 is embedded, the read-only memory for the processor provides a permanent record of the programs to be operated by the processor. A read-only memory common application protocol (ROMCAP) 1040 is also provided for the embedded processor 302. As previously described, the common application protocol 1040 provides information to the embedded processor 302 in accordance with the steps in the flow chart shown in FIG. 11 and described above. This is represented by an arrow 1042. A bus 1044 extends between the ROMCAP 1040 and an embedded random access memory (RAM) 1045. The embedded RAM 1045 contains the new embedded extension form registry.

A bus 1046 extends between the non-embedded processor 320 and a hub for the graphic memory controller 321 shown in FIG. 3. As indicated above, the non-embedded processor 320 provides display information to the display 307 in FIG. 3 by way of the memory and graphics controller 321. As also indicated above and as shown in FIG. 3, the embedded processor 302 and the non-embedded processor 320 may access the memory and storage module 385 via memory and graphics controller 321.

A bus 1047 extends between the graphic memory and controller hub 321 and a random access memory (RAM) 1049. The RAM 1049 provides volatile data which is erased when the non-embedded processor 320 is put to sleep. A bus 1048 also extends between the graphics memory and controller hub 321 and the integrated controller hub 1032. The integrated controller hub 1032 may include several different controller hubs including the display controller 308 and the controller and I/O module 322 and a controller 1050 for a hard disk drive. A bus 1054 extends between the graphics memory and controller hub 321 and an SGB 1054.

All publications and patent applications mentioned in this specification are herein incorporated by reference to the same extent as if each individual publication or patent application was specifically and individually indicated to be incorporated by reference. The invention having been fully described, it will be apparent to one of ordinary skill in the art that many changes and modifications can be made thereto without departing from the spirit or scope of the appended claims.

What is claimed is:

1. A method of providing for the passage of information between a hand-held device and a second device displaced from the hand-held device, including the steps of:
providing a first processor at the hand-held device, the first processor performing relatively simple functions,
providing a second processor at the hand-held device, the second processor requiring a greater use of energy than the first processor, the second processor performing functions more complicated than the relatively simple functions performed by the first processor,
providing a source of energy at the hand-held device for operating the first and second processors,
providing normally for the operation of the first processor in processing data to perform the relatively simple functions and providing for the operation of the second processor, under the control of the first processor independently of the operation of the second processor, in processing data to perform the more complicated functions,
storing data in the first processor for use in operating the second processor, and
providing for the transfer of the data from the first processor to the second processor when the second processor is to be operated in performing the more complicated functions.

2. A method as set forth in claim 1 wherein
the second processor is provided with a temporary storage of data for use by the second processor and wherein the data for use by the second processor is transferred from the second processor to the first processor and stored in the first processor and wherein the data stored in the first processor for use by the second processor is transferred from the first processor to the second processor, independently of the operation of the second processor, for processing in the second processor when the second processor is to be used in performing the more complicated functions.

3. A method as set forth in claim 2 wherein
the data transferred from the first processor to the second processor for use by the second processor updates in the second processor the data previously recorded in the second processor.

4. A method as set forth in claim 1 wherein
the second processor is normally in a sleep mode and wherein
the second processor is awakened by the first processor independently of the operation of the second processor when it is to be operated to process data and wherein
the data stored in the first processor for use by the second processor is transferred to the second processor, independently of the operation of the second processor, for the performance by the second processor of the more complicated functions when the second processor is awakened.

5. A method as set forth in claim 4 wherein
the information transferred from the first processor to the second processor for use by the second processor in performing the more complicated functions updates in the second processor the information previously recorded in the second processor to perform the more complicated functions.

6. A method as set forth in claim 1 wherein
the data is transferred between the first and second processors in a universal serial bus.

7. A method of providing for the passage of information between a hand-held device and a second device displaced from the hand-held device, including the steps of:
providing an embedded processor at the hand-held device for processing relatively simple functions,
providing a non-embedded processor at the hand-held device for processing functions more complicated than the relatively simple functions,
providing a permanent memory for storing data for the embedded processor and the non-embedded processor,
providing for an activation of the embedded processor in performing the relatively simple functions and for an activation of the non-embedded processor by the embedded processor, without any control by the non-embedded processor in the operation of the embedded processor, when the non-embedded processor is to be used to perform the more complicated functions,
storing data in the permanent memory for the embedded processor and the non-embedded processor,
providing a temporary memory in the non-embedded processor for the data to be processed in the non-embedded processor when the non-embedded processor performs the more complicated functions, and
providing for a transfer to the temporary memory of the data in the permanent memory under the control of the embedded processor without any control by the non-embedded processor, for use in the non-embedded processor when the non-embedded processor is to be activated to perform the more complicated functions.

8. A method as set forth in claim 7 wherein
the data in the permanent memory for processing by the non-embedded processor is transferred to the temporary memory in the non-embedded processor when the non-embedded processor is activated to perform the more complicated functions and wherein
the non-embedded processor process the data transferred to the temporary memory when the non-embedded processor is used to perform the more complicated functions.

9. A method as set forth in claim 7 wherein
the embedded processor performs first functions and the non-embedded processor performs second functions different from, and requiring more power than, the performance of the relatively simple functions in the embedded processor when the non-embedded processor is activated to perform the more complicated functions.

10. A method as set forth in claim 8 wherein
the non-embedded processor processes the data transferred to the non-embedded processor and wherein
the non-embedded processor processes data only when it is activated to perform the more complicated functions.

11. A method as set forth in claim 9 wherein
the embedded processor normally processes data in performing the relatively simple functions and wherein
the embedded processor activates the non-embedded processor to process data in performing the relatively complicated functions and wherein
the embedded processor provides for the transfer to the non-embedded processor of the data to be processed by the non-embedded processor when the non-embedded processor is activated to process data in performing the complicated functions and wherein the non-embedded processor processes the data transferred to it by the embedded processor in performing the more complicated functions.

12. A method as set forth in claim 9 wherein
the embedded processor activates only the portions of the non-embedded processor which process the data transferred to the non-embedded processor from the embedded processor in performing the more complicated functions.

13. A method as set forth in claim 8 wherein
the non-embedded processor processes data only when it is activated to perform the more complicated functions and wherein
the non-embedded processor is normally inactivated and wherein
the embedded processor activates the non-embedded processor when the non-embedded processor is to process data in performing the more complicated functions and wherein
the embedded processor transfers to the non-embedded processor the data to be processed by the non-embedded processor when the non-embedded processor is activated to perform the more complicated functions.

14. A method as set forth in claim 13 wherein
the embedded processor performs first functions and the non-embedded processor performs second functions different from, and requiring more power than, the first functions when the non-embedded processor is activated and wherein
the non-embedded processor processes the data transferred to the non-embedded processor to perform the more complicated functions and wherein
the non-embedded processor processes data only when it is activated and wherein
the embedded processor activates only the portions of the non-embedded processor which process the data transferred to the non-embedded processor from the embedded processor when the non-embedded processor performs the more complicated functions.

15. A method of providing for the passage of information between a hand-held device and a second device displaced from the hand-held device, including the steps of:
providing an embedded processor for processing first data to perform first functions,
providing a non-embedded processor for processing second data different from the first data to perform second functions more complicated than the first functions,
providing for the non-embedded processor to be in a sleep state and to be awakened by the embedded processor from the sleep state, without any control from the non-embedded processor, when the non-embedded processor is to process the second data in performing the second functions,
providing for a hand-held source of energy for the embedded processor and the non-embedded processor,
introducing new protocols, and changes in and additions to existing protocols, for the non-embedded processor into an extension form registry at the non-embedded processor, and
transferring to the embedded processor the new protocols and the changes in and additions to the existing protocols, in the extension form registry at the non-embedded processor for storage by the embedded processor and for use in performing the second functions at the non-embedded processor, and
transferring protocols in the embedded processor to the non-embedded processor for obtaining the performance of the second functions by the non-embedded processor when the non-embedded processor is awakened by the embedded processor.

16. A method as set forth in claim 15, including the steps of:
providing for the non-embedded processor to be normally inactivated,
providing for the activation of the non-embedded processor by the embedded processor without any guidance from the non-embedded processor,
providing for a selection by the embedded processor, without the guidance of the non-embedded processor, of one of the protocols in the extension form registry at the embedded processor when the non-embedded processor has been activated by the embedded processor, this protocol to be performed by the non-embedded processor, and
providing for the transfer of the selected one of the protocols by the embedded processor to the non-embedded processor without the guidance of the non-embedded processor when the non-embedded processor is activated to perform the functions represented by the selected one of the protocols.

17. A method as set forth in claim 15, including the steps of:
providing a universal bus between the embedded processor and the non-embedded processor to provide for a transfer of protocols in the extension form registry between the embedded processor and the non-embedded processor.

18. A method as set forth in claim 15, including the steps of:
providing in the protocols in the extension form registry for the activation in the non-embedded processor of only the portions of the non-embedded processor required in the non-embedded processor to perform the selected one of the second functions.

19. A method of providing for the passage of information between a hand-held device and a second device displaced from the hand-held device, including the steps of:
providing at the hand-held device a first processor capable of performing first functions,
providing at the hand-held device a second processor capable of performing second functions different from the first functions and requiring more power than the power required by the first functions,
providing power at the hand-held device for the first processor,
providing power at the hand-held device for the second processor only when the second processor is to perform one of the second functions,
providing protocols initially to the second processor for providing for the operation by the second processor of the second functions,
transferring the protocols from the second processor to the first processor for retention in the first processor, and
providing at the first processor, independently of the operation of the second processor, for the transfer of the protocols from the first processor to the second processor to obtain the operation of the second processor in performing the second functions.

20. A method as set forth in claim 19, including the steps of:
processing the protocols in the second processor before the introduction of the protocols to the first processor.

21. A method as set forth in claim 19, including the steps of:

providing power from the hand-held device to the second processor when the first processor indicates to the second processor that the second processor is to perform one of the second functions in accordance with a selected one of the protocols, and transferring the selected one of the protocols from the first processor to the second processor when the second processor is to perform one of the second functions in accordance with the selected one of the protocols.

22. A method as set forth in claim 21, including the steps of:

performing the selected one of the functions in the second processor after the selected one of the protocols has been transferred to the second processor and while power is being applied to the second processor from the hand-held device.

23. A method as set forth in claim 22, including the steps of:

providing power only to the portions of the second processor performing the second functions in accordance with the protocols transferred from the first processor to the second processor.

24. A method as set forth in claim 23, including the steps of:

processing the protocols in the second processor before the introduction of the protocols to the first processor, the processing including the recording of new protocols in the second processor and the updating of already existing protocols in the second processor.

25. A method as set forth in claim 5 wherein the data intended for use by the second processor in performing the more complicated functions is initially transferred to the second processor and is transferred from the second processor to the first and is subsequently transferred from the first processor to the second processor when the data id to be processor by the second processor in performing the more complicated function.

26. A method as set forth in claim 2 wherein the data transferred from the first processor to the second processor for use by the second processor updates in the second processor the data previously recorded in the second processor and wherein the second processor is normally in a sleep mode and wherein the second processor is awakened by the first processor, independently of the operation of the second processor, when the second processor is to be operated to process data and wherein the data stored in the first processor for use by the second processor is transferred to the second processor for the performance by the second processor of the more complicated functions when the second processor is awakened.

27. A method as set forth in claim 7 wherein the data transferred to the temporary memory from the permanent memory is erased from the temporary the memory after the data is used to perform the more complicated functions.

28. A method as set forth in claim 8 wherein the embedded processor performs first functions and the non-embedded processor performs second functions different from, and requiring more power than, the performance of the relatively simple functions in the embedded processor when the non-embedded processor is activated to perform the more complicated functions and wherein the embedded processor normally processes data in performing the relatively simple functions and wherein the embedded processor activates the non-embedded processor when the non-embedded processor is to process data in performing the more complicated functions and wherein the embedded processor provides for the transfer to the non-embedded processor of the data to be processed by the non-embedded processor when the non-embedded processor activated to process data in performing the more complicated functions and wherein the non-embedded processor processes the data transferred to it by the embedded processor when the non-embedded processor performs the more complicated functions and wherein the embedded processor activates only the portions of the non-embedded processor which process the data transferred to the non-embedded processor from the embedded processor in performing the more complicated functions and wherein the data transferred to the temporary memory from the permanent memory is erased from the temporary memory after the data is used to perform the more complicated functions.

29. A method as set forth in claim 8 wherein the data transferred to the temporary memory from the permanent memory is erased from the temporary memory after the data is used to perform the more complicated functions.

30. A method as set forth in claim 15 wherein the protocol transferred by the embedded processor to the non-embedded processor is erased from the non-embedded processor when the non-embedded processor has performed the functions represented by the protocol.

31. A method as set forth in claim 15 wherein only the protocols providing for the performance of a selected one of the second functions are transferred from the embedded processor to the non-embedded processor when the selected one of the second functions is to be performed by the non-embedded processor.

32. A method as set forth in claim 21 wherein the protocols transferred from the first processor to the second processor are erased from the second processor after the second processor has performed the second functions in accordance with such protocols.

33. A method as set forth in claim 21, wherein the protocols transferred from the first processor to the second processor are erased from the second processor after the second processor has performed the second functions in accordance with such protocols.

* * * * *

UNITED STATES PATENT AND TRADEMARK OFFICE
CERTIFICATE OF CORRECTION

PATENT NO. : 6,976,180 B2  
APPLICATION NO. : 10/158266  
DATED : December 13, 2005  
INVENTOR(S) : Cupps et al.

It is certified that error appears in the above-identified patent and that said Letters Patent is hereby corrected as shown below:

Column 8  
Line 5-6, delete "interfaces" and insert-- interfacing --.

Column 14  
Line 30, delete "particularly" and insert -- particular --.

Column 21  
Line 36, delete "id" and insert -- is --.  
Line 36, delete the second instance of "processor" and insert -- processed --.

Column 22  
Line 15, after "processor" insert -- is --.

Signed and Sealed this

Twelfth Day of December, 2006

JON W. DUDAS  
*Director of the United States Patent and Trademark Office*